(12) United States Patent
Omagari

(10) Patent No.: US 11,790,477 B2
(45) Date of Patent: Oct. 17, 2023

(54) DIGITAL WATERMARK ANALYSIS APPARATUS AND DIGITAL WATERMARK ANALYSIS METHOD

(71) Applicant: CANON KABUSHIKI KAISHA, Tokyo (JP)

(72) Inventor: Yuki Omagari, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/828,313

(22) Filed: May 31, 2022

(65) Prior Publication Data

US 2022/0383443 A1   Dec. 1, 2022

(30) Foreign Application Priority Data

May 31, 2021  (JP) .................................. 2021-091804

(51) Int. Cl.
*G06T 1/00* (2006.01)
*H04N 1/32* (2006.01)

(52) U.S. Cl.
CPC .......... *G06T 1/005* (2013.01); *H04N 1/3232* (2013.01); *H04N 1/32352* (2013.01); *G06T 2201/0065* (2013.01); *G06T 2201/0202* (2013.01)

(58) Field of Classification Search
CPC ............. G06T 1/005; G06T 2201/0065; G06T 2201/0202; G06T 2201/0052; G06T 2201/0061; G06T 2201/0083; G06T 2201/0601; G06T 1/0028; G06T 1/0064; H04N 1/3232; H04N 1/32352
See application file for complete search history.

(56) References Cited

U.S. PATENT DOCUMENTS 8,189,853 B2     5/2012  Komatsubara et al.
2016/0132984 A1* 5/2016  Fan .................... G06V 10/431
                                                382/100

FOREIGN PATENT DOCUMENTS

JP      2005229508 A      8/2005
JP        4645457 B2      3/2011

* cited by examiner

*Primary Examiner* — Christopher Wait
(74) *Attorney, Agent, or Firm* — Venable LLP

(57) ABSTRACT

A digital watermark analysis apparatus, comprising an image capturing unit for capturing a printed product where additional information is embedded by superimposing a pattern on an image to acquire a captured image, a calculation unit for calculating a spatial frequency characteristic of each small area in the captured image, a specifying unit for specifying an embedded signal strength and an embedding position of the additional information, a decision unit for deciding, based on the embedding position information and the embedded signal strength information, a position in the captured image of a marker detection area for detecting a marker as a reference position for acquiring the additional information, and an acquisition unit for detecting a marker in the marker detection area and acquiring the additional information in the captured image with reference to the detected marker.

12 Claims, 23 Drawing Sheets

F I G. 8A

```
01 : <svg xmlns="http://www.w3.org/2000/svg" xmlns:xlink="http://www.w3.org/1999/xlink"
     width="300" height="400" viewBox="0 0 300 400">
02 : <image width="300" height="400" x="0" y="0" xlink:href="image.jpg"></image>
03 : </svg>
```

F I G. 8B

```
01 : <svg xmlns="http://www.w3.org/2000/svg" xmlns:xlink="http://www.w3.org/1999/xlink"
     width="950" height="1400" viewBox="0 0 950 1400">
02 : <image width="950" height="1400" x="0" y="0" xlink:href="image.jpg"></image>
03 : </svg>
```

```
01 : <?xml version="1.0" ?>
02 : <content>
03 :   <papersize>89x127mm</papersize>
04 :   <papertype>photographic</papertype>
05 :   <printquality>normal</printquality>
06 :   <imageData>
07 :     <width>950</width>
08 :     <height>1400</height>
09 :     <format>JPEG</format>
10 :     <data> JPEG DATA</data>
11 :   </imageData>
12 : </content>
```

| Area | Angle |
|---|---|
| a | 0 |
| b | 10 |
| c | 20 |
| d | 30 |
| e | 40 |
| f | 50 |
| g | 60 |
| h | 70 |
| i | 80 |

FIG. 23

| R | G | B | STRENGTH |
|---|---|---|---|
| 0 | 0 | 0 | 5 |
| 0 | 0 | 32 | 11 |
| 0 | 0 | 64 | 12 |
| 0 | 0 | 96 | 18 |
| 0 | 0 | 128 | 14 |
| 0 | 0 | 160 | 13 |
| ... | ... | ... | ... |
| 255 | 255 | 192 | 6 |
| 255 | 255 | 224 | 3 |
| 255 | 255 | 255 | 4 |

DIGITAL WATERMARK ANALYSIS APPARATUS AND DIGITAL WATERMARK ANALYSIS METHOD

BACKGROUND OF THE INVENTION

Field of the Invention

The present invention mainly relates to a digital watermark analysis apparatus.

Description of the Related Art

There is known a technique called a digital watermark (see Japanese Patent Laid-Open No. 2005-229508 and Japanese Patent No. 4645457). The digital watermark is a technique of embedding additional information associated with an image in the image so as to be difficult to he visually discriminated, and can also he called a watermark. As a similar technique, there is known a technique called steganography for embedding additional information which is not associated with an image. The image embedded with the additional information is circulated via a network such as the Internet, and the additional information is extracted from the image embedded with the additional information.

Furthermore, the image embedded with the additional information can be printed on a sheet by an image output apparatus such as a copying machine and a printer, and then the additional information can be extracted from the thus obtained printed product. The additional information can be extracted from the printed product by analyzing the image of the printed product captured using an image reading function of a scanner or a camera function of a portable terminal.

According to Japanese Patent Laid-Open No. 2005-229508, it is necessary to evaluate, in advance, the reading strength. According to Japanese Patent No. 4645457, a specific degree of embedded signal strength with which information is embedded at a specific position in a captured image needs to have been specified in advance. Therefore, in arrangements described in Japanese Patent Laid-Open No. 2005-229508 and Japanese Patent No. 4645457, there is room for improvement to make it possible to read an unknown digital watermark from a printed product.

SUMMARY OF THE INVENTION

The present invention provides a technique advantageous for diverse methods of reading a digital watermark.

One of the aspects of the present invention provides a digital watermark analysis apparatus comprising: an image capturing unit configured to capture a printed product in which additional information is embedded by superimposing a pattern having a predetermined period or frequency on an image, and acquire a thus obtained image as a captured image; a calculation unit configured to calculate a spatial frequency characteristic of each small area by analyzing a plurality of small areas in the captured image; a specifying unit configured to specify an embedded signal strength and an embedding position of the additional information in the captured image based on the spatial frequency characteristic; a decision unit configured to decide, based on the embedding position information and the embedded signal strength information, a position, in the captured image, of a marker detection area for detecting a marker as a reference position for acquiring the additional information; and an acquisition unit configured to detect a marker in the marker detection area and acquire the additional information in the captured image with reference to a position of the detected marker.

Further features of the present invention will become apparent from the following description of example embodiments (with reference to the attached drawings).

BRIEF DESCRIPTION OF THE DRAWINGS

FIG. 8A is a view showing an example of a description of SVG;
FIG. 8B is a view showing an example of a description of SVG;
FIG. 23 is a table showing an example of an embedded signal strength table.

DESCRIPTION OF THE EMBODIMENTS

Figure 1:
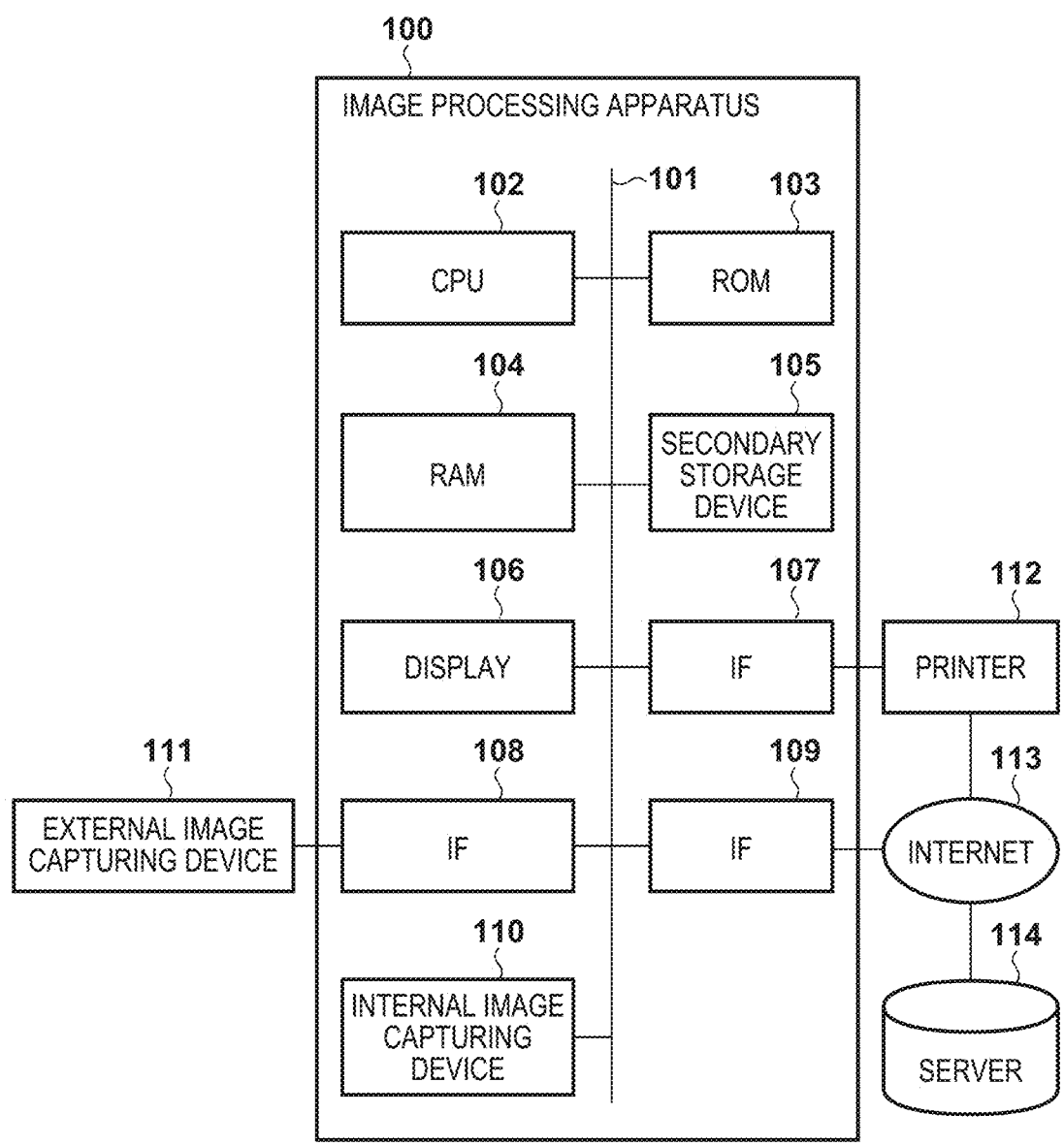
FIG. 1 is a block diagram showing an example of the hardware arrangement of an image processing system.

Hereinafter, embodiments will be described in detail with reference to the attached drawings, Note, the following embodiments are not intended to limit the scope of the claimed invention. Multiple features are described in the embodiments, but limitation is not made to an invention that requires all such features, and multiple such features may be combined as appropriate. Furthermore, in the attached. drawings, the same reference numerals are given to the same or similar configurations, and redundant description thereof is omitted.

First Embodiment

<Overview of Image Processing System>

An image processing apparatus (represented by an image processing apparatus 100 which may be represented as an information processing apparatus 100) according to the first embodiment includes an application 400 (see FIG. 4) capable of executing embedding and reading of additional information, and will be described in detail later. The application 400 is a program for creating image data as a content in which additional information is embedded, and can also be represented as an application program. Although described later with reference to FIG. 1 and the like, the image processing apparatus 100 generates print data from image data. as a content, and transmits the print data to a printer 112. The printer 112 executes printing using the print data, and outputs a printed product embedded with the additional information.

The "additional information" indicates information embedded in a printed product. The additional information is embedded, added, or multiplexed in a printed product so as not to be visually conspicuous or so as to be difficult to be visually discriminated. Such additional information can also be represented as multiplexed information, watermark information, or embedded information.

<Hardware Arrangement of Image Processing Apparatus>

FIG. 1 shows an example of the arrangement of an image processing system SY according to this embodiment, The image processing system SY includes the image processing apparatus 100, an external image capturing device 111, the printer 112, and a server 114, The image processing apparatus 100 and the printer 112 can be interconnected directly or via a network 113. Note that FIG. 1 shows a state in which the server 114 is connected via the network 113. However, this may be omitted in other embodiments.

As the image processing apparatus 100, a known portable or non-portable terminal is used. For example, a smartphone, a tablet PC (personal computer), a notebook PC, a desktop PC, or the like can typically be used. This embodiment assumes that a so-called smartphone which includes a touch panel display is used as the image processing apparatus 100.

The image processing apparatus 100 includes a CPU (Central Processing Unit) 102, a ROM (Read Only Memory) 103, and a RAM (Random Access Memory) 104, The image processing apparatus 100 further includes a secondary storage device 105, a display 106, IFs (interfaces) 107, 108, and 109, and an internal image capturing device 110.

The CPU 102 implements various kinds of processing (to be described later) by loading a predetermined program on a memory and executing it. FIG. 1 shows one CPU 102 but a plurality of CPUs or CPU cores may be provided. The ROM 103 stores the program to be executed by the CPU 102. The RAM 104 temporarily stores various kinds of information when the CPU 102 executes the program.

The secondary storage device 105 is a known storage medium or nonvolatile memory such as a hard disk drive (HDD), a solid-state drive (SSD), or a flash memory. The secondary storage device 105 stores various programs and data such as files and databases that hold the processing results of image analysis and the like.

The display 106 displays a UI (User Interface) for accepting operations for implementing various kinds of processing, and various kinds of information such as the result of executed processing. In this embodiment, a touch panel display is used as the display 106. That is, assume that the display 106 includes a touch sensor. This allows the user to input a desired operation to the display 106 by a touch operation such as a tap, swipe, pinch-in, or pinch-out operation.

The internal image capturing device (image capturing unit) 110 performs image capturing processing. Image data obtained by the image capturing processing undergoes predetermined image processing, and is then saved in the secondary storage device 105. Image data may be acquired from the external image capturing device 111 via the IF 108, and saved in the secondary storage device 105.

The IF 109 can communicate with an external apparatus (for example, the printer 112 or the server 114) via the network 113.

The IFs 107 to 109 may adopt one of a wired communication mode and a wireless communication mode. The image processing apparatus 100 can acquire image data from the external image capturing device 111 or the server 114 connected to the network 113 and output image data (print data) and the like to the printer 112 via the IFs 107 to 109. Examples of wired communication are USB and Ethernet®. Examples of wireless communication are a wireless LAN, NEC (Near Field Communication), Bluetooth®, and infrared communication.

The above-described components are interconnected via an internal bus 101, and the CPU 102 controls these components via the internal bus 101. In this embodiment, the CPU 102 executes the program. That is, the image processing apparatus 100 can be a software execution place (software execution environment).

<Hardware Arrangement of Printer>

Figure 2:
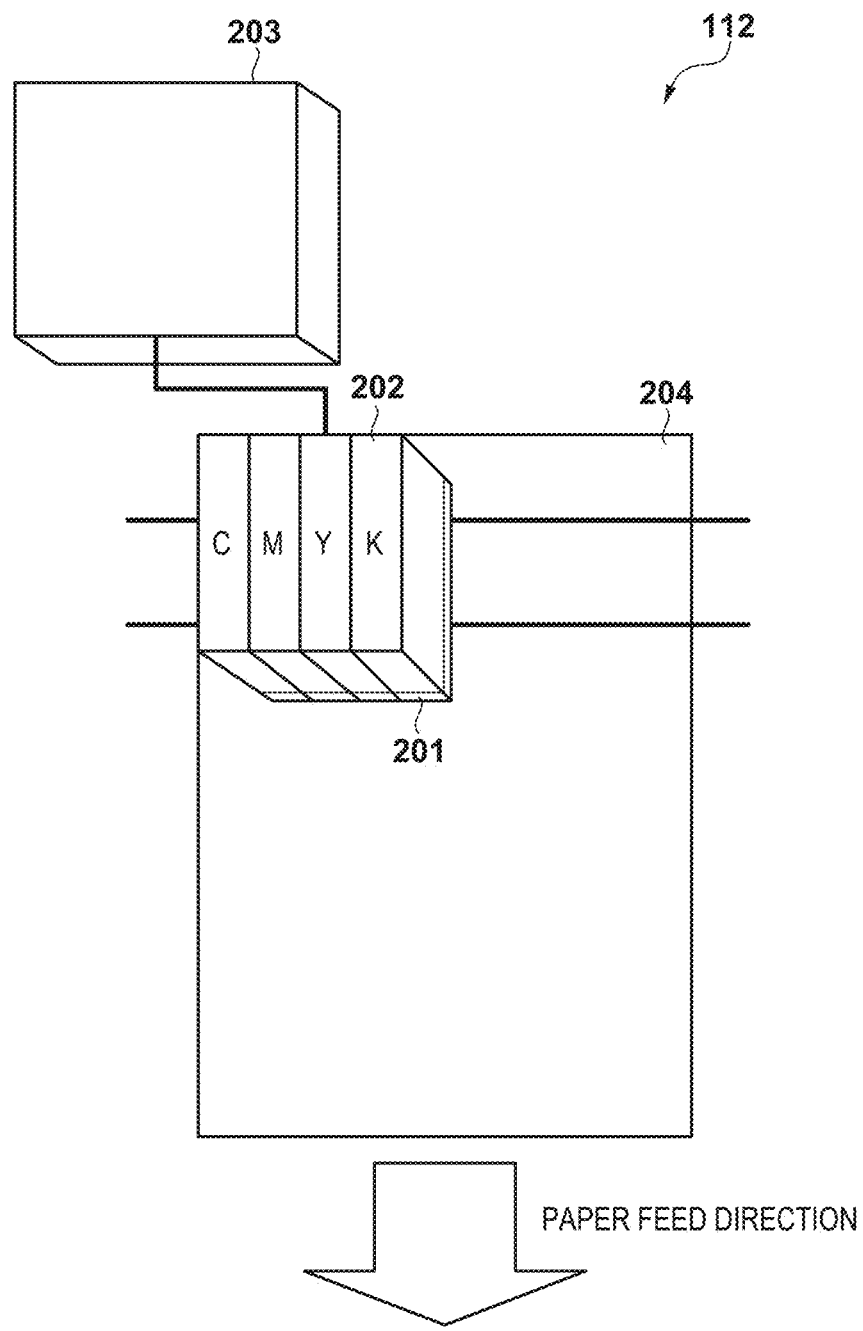
FIG. 2 is a schematic view of a printhead of a printer.

FIG. 2 is a schematic view showing part of the hardware arrangement of the printer 112. This embodiment assumes that the printer 112 adopts an inkjet method but another printing method such as an electrophotographic method may be adopted. The printer 112 includes a printhead 201, ink units 202, and a control circuit unit 203.

The printhead 201 is configured to scan (reciprocally move) in the width direction of a print medium 204, and executes printing by discharging, to the print medium 204, inks received from the ink units 202 mounted on the printhead 201. In this example, the four ink units 202 are provided but may include inks of any colors and may include inks of the same color or same type.

The control circuit unit 203 includes a storage unit, calculation unit, and communication unit which are necessary to drive the printhead 201. The printhead 201 receives a print signal and a control signal from the control circuit unit 203, and executes printing corresponding to the print signal based on the control signal. The print medium 204 as a recording medium is conveyed by a conveyance roller (not show) while the printhead 201 executes printing, thereby forming an image on the print medium 204.

Figure 3:
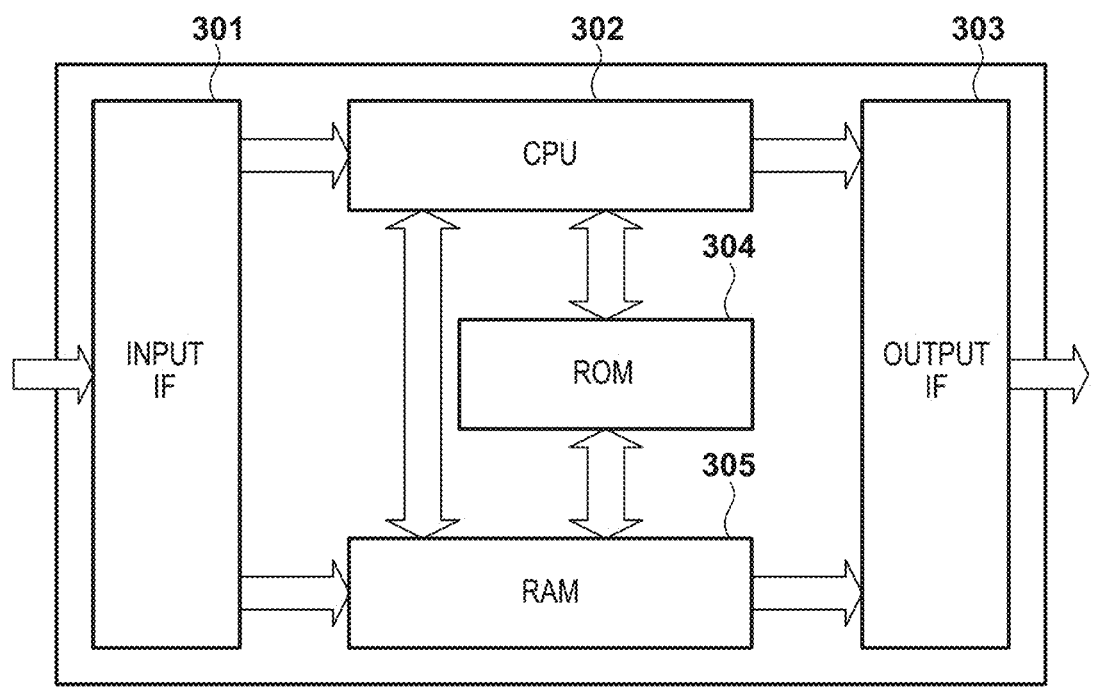
FIG. 3 is a view showing an example of the arrangement of a control circuit unit of the printer.

FIG. 3 is a block diagram showing the arrangement of the control circuit unit 203. The control circuit unit 203 includes an input IF 301, a CPU 302, an output IF 303, a ROM 304, and a RAM 305. The input IF 301 accepts, as an input signal, image data and a control signal for driving the printhead 201 from an image processing apparatus or the like outside the printer 112. The input IF 301 sends the image data and the control signal to the RAM 305 and the CPU 302.

In response to this, the CPU 302 executes a control program stored in the ROM 304 as a nonvolatile memory to perform signal processing for the image data. The image data having undergone the signal processing is output, as print data, from the output IF 303 together with the control signal. The printhead 201 is driven based on the output print data and the control signal, thereby printing an image on the print medium 204.

<System Configuration>

Figure 4:
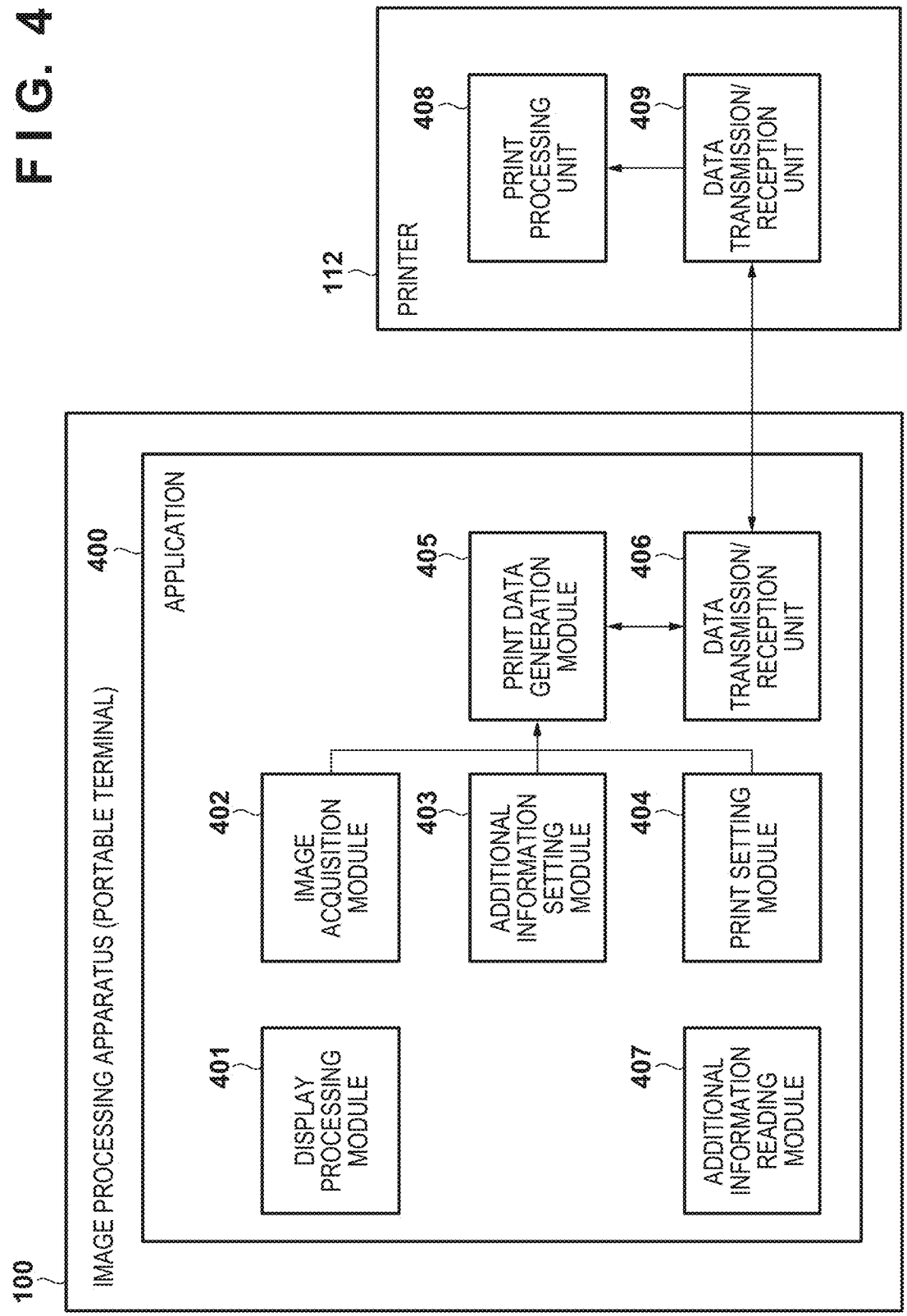
FIG. 4 is a block diagram showing an example of the configuration of the system.

FIG. 4 shows an example of the configuration of the image processing system including the application 400 and the printer 112. The application 400 operates on the image processing apparatus 100, and includes, in this embodiment, a display processing module 401, an image acquisition module 402, an additional information setting module 403, a print setting module 404, a print data generation module 405, a data transmission/reception module 406, and an additional information reading module 407. Note that the application 400 may further include another module (which may be represented as a block or the like), as needed.

The application 400 is stored as a program in the ROM 103 or the secondary storage device 105, and is read out and executed by the CPU 102. This causes the CPU 102 to function as each of the above-described modules of the application 400. The application 400 has a function of generating, based on image data to he printed and input additional information, image data embedded with the additional information, and a function of transmitting print data. for printing the generated image data to the printer 112.

The printer 112 includes a print processing unit 408 and a data transmission/reception unit 409. The print processing unit 408 and the data transmission/reception unit 409 are implemented when the CPU 302 reads out a program stored in the ROM 304 and executes it.

Figure 5:
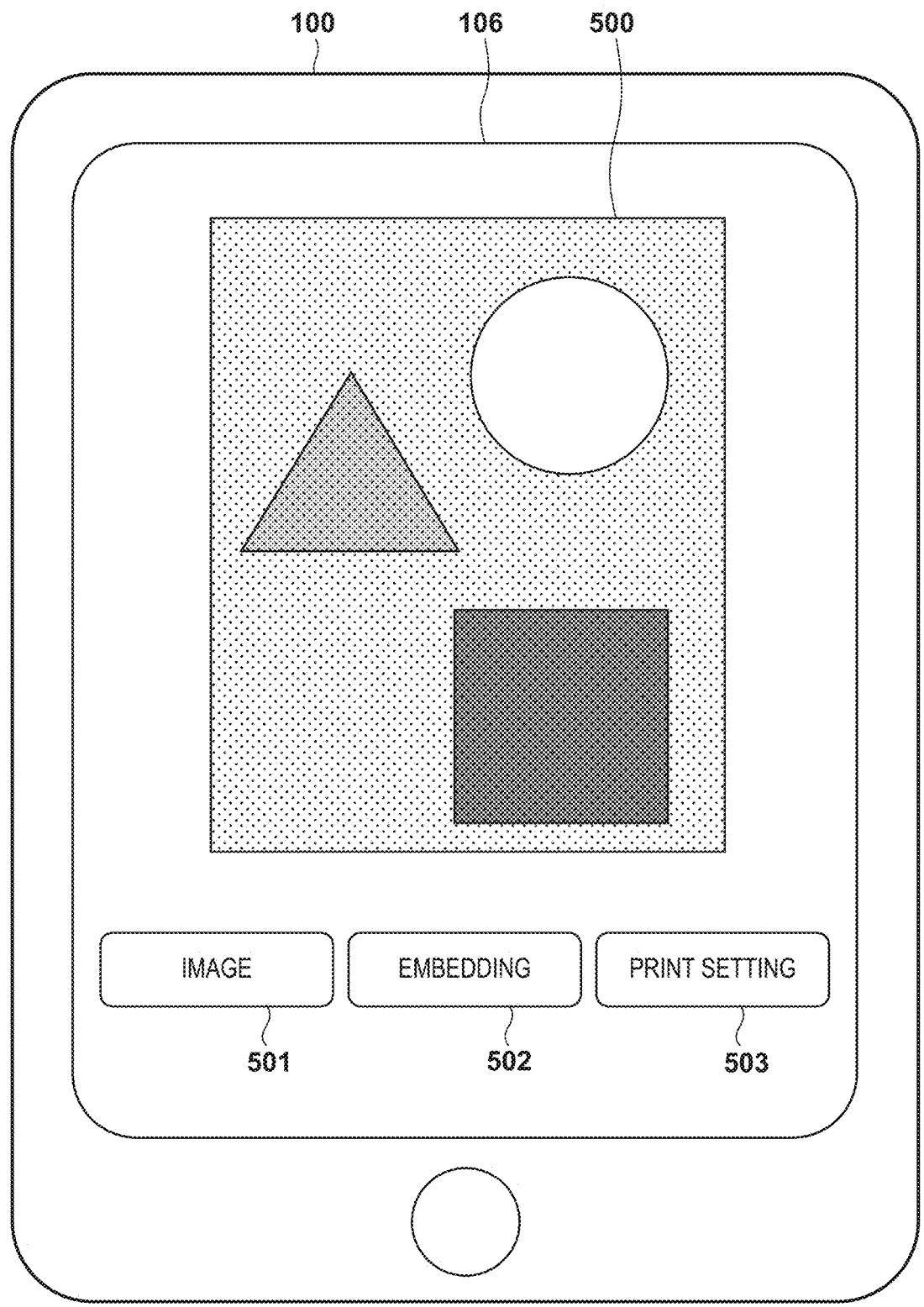
FIG. 5 is a view showing an example of the screen arrangement of an application.

FIG. 5 shows an example of the screen of the application 400 operating on the image processing apparatus 100. Processing performed by each component exemplified in FIG. 4 will be described below with reference to FIG. 5.

The display processing module 401 performs processing of displaying character information to be embedded as additional information, an image to be used for print processing, and the like on the display 106 of the image processing apparatus 100. The display processing module 401 also has a function of displaying information concerning the user interface (UI) such as buttons for selecting an image, characters, and the like, and a print setting list.

As exemplified in FIG. 5, an image selection button 501, an embedded information setting button 502, and a print setting button 503 can be displayed on the display 106 of the image processing apparatus 100. Furthermore, in a content editing area 500, an image as a content during editing can be displayed. Note that the buttons 501 to 503 are not limited to this example, and may be added with other names or may be symbolized icons.

The image acquisition module 402 acquires an image in which additional information is to be embedded. If, for example, the image selection button 501 is selected, an image selection dialog (a dialog box, or a window as another example) opens, and the user can select, using this dialog, an image usable in the image processing apparatus 100. This embodiment assumes that the user selects an image from the image selection dialog. As another embodiment, however, the user can activate the internal image capturing device 110, and use a captured image. The image acquired by the image acquisition module 402 is displayed in the content editing area 500, and can be enlarged, reduced, rotated, and moved by touch operations. Moreover, an arbitrary editing operation may additionally be performed.

Figure 6:
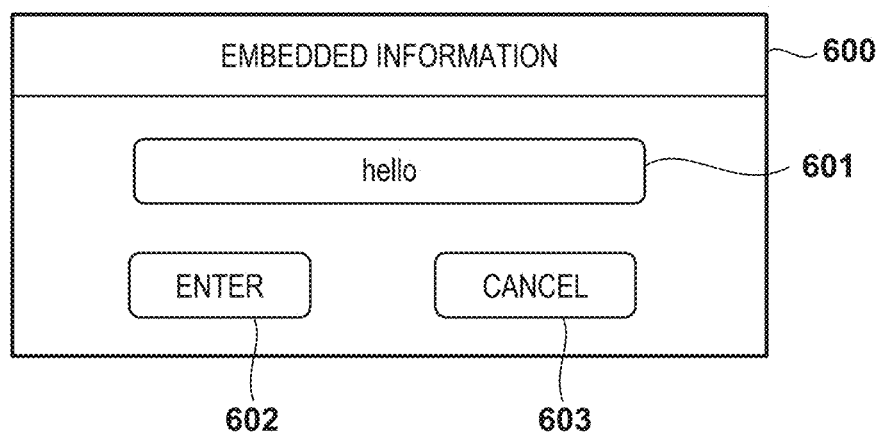
FIG. 6 is a view showing an example of an embedded information input dialog of the application.

FIG. 6 shows an example of an embedded information setting dialog 600. If the embedded information setting button 502 is pressed, the embedded information setting dialog 600 is displayed on the display 106. The additional information setting module 403 sets, as additional information, information edited. via the embedded information selling dialog 600. If the user taps an area 601, he/she can edit information (additional information) to be embedded. As an example, assume that a character string of "hello" is embedded as additional information.

In this example, text input is exemplified. As another embodiment, attribute information such as the copyright, shooting date/time, shooting location, and photographer regarding the image may be embedded as additional information. Alternatively, link destination information such as a URL (Uniform Resource Locator) may be embedded as additional information. As till another embodiment, information such as an audio and a moving image other than text may be embedded as additional information. If there is a common data table, identification information for identifying data of the data table may he embedded as additional information.

When the user completes the input, he/she can press an enter button 602. When the user cancels the input, he/she can press a cancel button 603.

Note that additional information may be embedded when the user intentionally inputs additional information to be embedded (see FIG. 6) or when the application 400 inputs additional information without user's intention. If, for example, the selected image is a JPEG image and information is embedded in an Exif (Exchangeable Image File Format) tag, information such as the shooting date/time and shooting location of the image can automatically be embedded.

Figure 7:
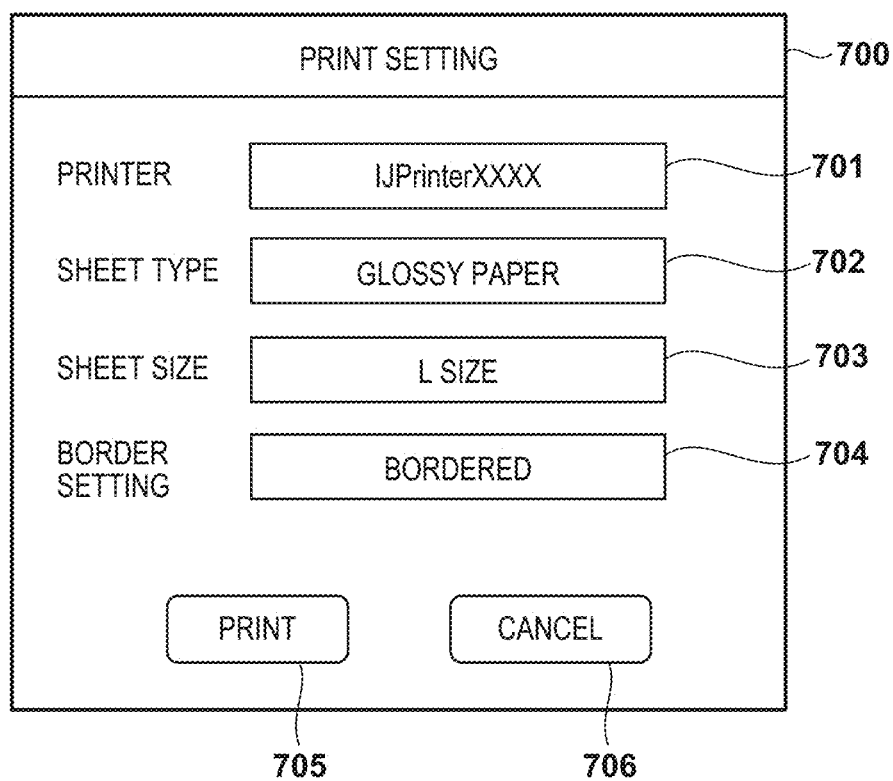
FIG. 7 is a view showing an example of a print setting dialog of the application.

FIG. 7 shows an example of a print setting dialog 700. If the print setting button 503 is pressed, the print setting dialog 700 is displayed on the display 106. The user can select a printer, select a sheet type, select a sheet size, and set bordered/borderless printing via the print setting dialog 700.

If a printer selection list 701 is tapped, a list of usable printers is displayed, and the user can select an arbitrary printer. If a sheet type list 702 is tapped, a list of usable sheet types is displayed, and the user can select an arbitrary sheet type. The sheet types are, for example, glossy paper, matte paper, and normal paper. If a sheet size selection list 703 is tapped, a list of sheet sizes usable for the sheet type selected in the sheet type list 702 is displayed, and the user can select an arbitrary sheet size. In addition, the user can make a border setting (bordered/borderless) at the time of printing by tapping a print border setting 704. Bordered printing indicates a printing method in which there are margins on the four sides of a printed product, and borderless printing indicates a printing method of executing printing without having margins on a sheet.

If a print button 705 is pressed, the print setting module 404 transmits the print settings to the print data generation module 405, and shifts to a print step. If a cancel button 706 is pressed, the screen returns to the previous screen without executing printing.

Note that the information concerning the print settings of the printer displayed on the print setting dialog 700 may be held in advance in the information processing apparatus, or may appropriately be downloaded from the server 114 or the printer 112 via the network 113.

The print data generation module 405 performs rendering processing of the content, embedding processing of the additional information, and generation processing of data necessary to execute printing in the printer 112. In the rendering processing, the print data generation module 405 generates, from the content acquired by the image acquisition module 402 and displayed in the content editing area 500, image data to be used for printing. In the embedding processing of the additional information, the print data generation module 405 embeds the additional information set by the additional information setting module 403 in the image data generated in the rendering processing. Note that the embedding processing of the additional information may be represented as multiplexing processing.

The content to be used to generate print data can be described using a web standard language (HTML (Hyper Text Markup Language), CSS, JavaScrip®, or the like). This embodiment assumes that SVG (Scalable Vector Graphics) as one of graphic description methods in HTML is used. However, the present invention is not limited to this. For example, Canvas which is used to describe graphics in HTML may be used.

FIGS. 8A and 8B each show an example of a description of a content used. for printing according to this embodiment. FIG. 8A shows an overview of an example of a description of SVG of a content when only one image is arranged. Note that each number at the left end in FIGS. 8A and 8B indicates a line number.

Referring to FIG. 8A, the first line indicates that the content is described in SVG and the size of SVG. The second line indicates a description concerning an image added to the content. In this embodiment, the application 400 is configured to create a content of only one image but text, a stamp, and the like may be added to it. In this case, information of the added text, stamp, and the like is described in SVG.

Next, processing until the print data generation module 405 executes rendering processing of the content described in SVG and performs embedding processing of additional information to generate print data will be described with reference to FIG. 9.

Figure 9:
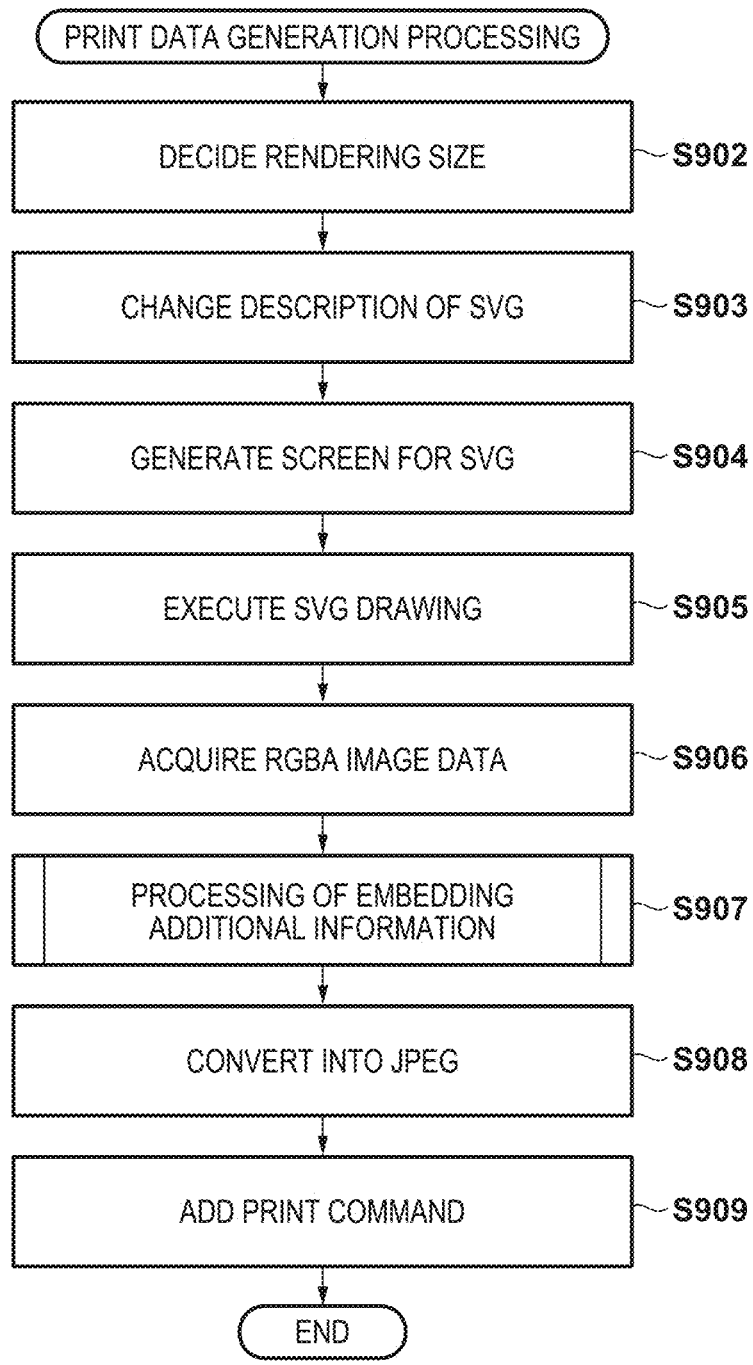
FIG. 9 is a flowchart of print data generation processing.

FIG. 9 is a flowchart illustrating an example of print data generation processing performed by the print data generation module 405.

In step S902 (to be simply referred to as "S902" hereinafter) (the same applies to other steps to be described alter), the print data generation module 405 decides a rendering size corresponding to the sheet settings. If, for example, the sheet settings indicate L size, bordered printing, and a print resolution of 300 dpi, the rendering size is a width of 950 px (pixels)×a height of 1400 px.

Note that if a print resolution other than 300 dpi is settable as a print setting, a rendering size corresponding to another print resolution is decided. For example, if, as described above, the sheet settings indicate L size, bordered printing, and a print resolution of 600 dpi, a rendering size of 1900 px×2800 px is calculated.

In S903, the print data generation module 405 rewrites part of SVG as the content for printing. In this example, the width and height of SVG is changed based on an image size transmitted to the printer 112 in accordance with the rendering size decided in S902. More specifically, width and height of the second and third lines of SVG shown in FIG. 8A are changed to "950" and "1400", respectively, and viewBox of the second line is changed to "0 0 950 1400". FIG. 8B shows an example of rewritten SVG.

In S904, the print data generation module 405 requests the OS (Operating System) (not shown) of the image processing apparatus 100 to generate a screen. In this example, with reference to SVG rewritten in S903, information of a region of 950 px×1400 px is acquired. Then, the OS executes screen generation (950 px×1400 px) for SVG. Information concerning the size of SVG may be held not in SVG but in the application 400. After that, as a screen generated by the OS, a screen which is not displayed on the UI is generated as an offscreen screen.

In S905, the print data generation module 405 requests the OS to draw SVG on the screen generated in S904. The OS loads the information of SVG. At the timing of loading the information of SVG, the application 400 receives a load completion notification from the OS. This notification is made using a standard function of the OS. Upon receiving the load completion notification, the application 400 determines that drawing of SVG is complete, and the process advances to the next step.

In S906, the print data generation module 405 requests image data of the content of the OS. The image data indicates RGBA data of the content displayed on the offscreen screen. In short, S906 can be a step of executing a screen capture operation. In response to the request from the application 400, the OS executes a screen capture operation of the offscreen screen on which the content is drawn, and transmits the acquired RGBA data to the application 400.

In S907, the print data generation module 405 performs processing of embedding additional information in the RGBA data acquired in S906. As the additional information, the additional information which has been embedded in the image so as to be difficult to be visually discriminated and set by the additional information setting module 403 is used. The additional information embedding processing will be described in detail later. The RGBA data acquired from the OS in S906 includes information of A (Alpha which is a degree of transparency in this example). In this embodiment, the information of the degree of transparency is not used for printing, and is thus deleted, and the additional information embedding processing is performed for the thus obtained RGB data.

In S908, the print data generation module 405 converts the RGB data having undergone the additional information embedding processing into JPEG image data. Note that this embodiment exemplifies a form of converting image data into JPEG image data. However, another known form may be adopted and, for example, PDF (Portable Document Format) may be adopted.

In S909, the print data generation module 405 adds a print command for transmission to the primer 112 to the JPEG image data generated in S908. The data added to the JPEG image data is generated based on the above-described print setting information. In addition, in S909, the print data generation module 405 may add a command to control the printer 112, as needed.

Figures 10, 11:
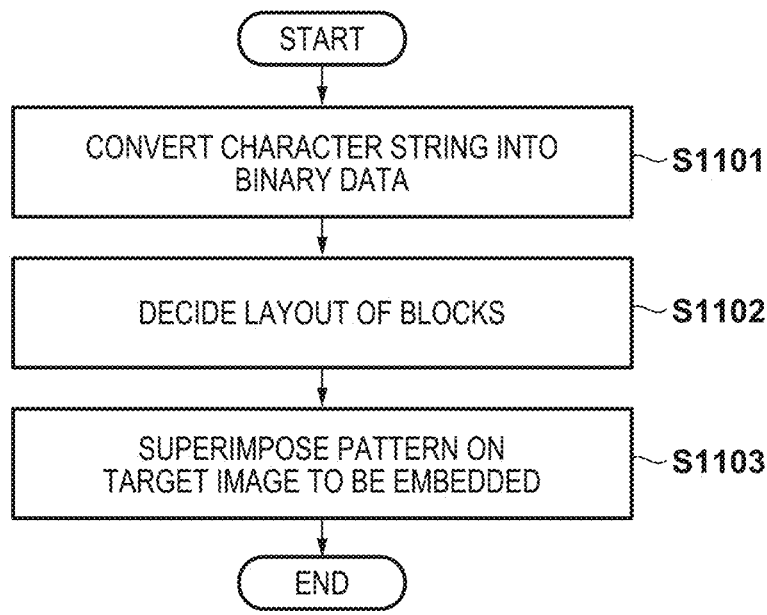
FIG. 10 is a view showing an example of a print command.
FIG. 11 is a flowchart of additional information embedding processing.

FIG. 10 shows an example of a print command of print data. In this example, as a print command, a command described in the XML format is used. In the third to fifth lines, settings for the printer indicating that "printing glossy paper of L size in a standard mode" are described. In the seventh to ninth lines, it is described that the print data is "JPEG data of a width of 950 and a height of 1400". In the 10th line, it is described that the JPEG data converted in S909 is inserted.

The printer 112 executes printing by receiving the above-described print command together with the image data (JPEG data). By performing the above steps, the rendering processing, the additional information embedding processing, and the print data generation processing executed by the print data generation module 405 end.

Referring back to FIG. 4, the data transmission-/reception module 406 of the image processing apparatus 100 transmits the print data to the printer 112. The application 400 requests the OS to transmit the print data, and the OS transmits, to the printer 112, the data received from the application. Transmission of the data is implemented by a known method that can make the image processing apparatus 100 and the printer 112 communicable with each other, and is performed by wireless Wi-Fi. As another example, transmission of the data may be performed via a wire, and may be implemented by, for example, connecting the image processing apparatus 100 and the printer by a USB port. In this case, the data is converted, by the printer driver of the image processing apparatus 100, into raster data printable by the printer 112, and the raster data is transmitted to the printer 112 by the USB port. Alternatively, the raster data may be converted into data printable by the printer 112, and printed.

In the printer 112, the data transmission/reception unit 409 receives the print data from the image processing apparatus 100. The data transmission/reception. unit 409 analyzes the print command included in the received print data, and sends, to the print processing unit 408, the print setting information obtained by the analysis processing and indicating the sheet size and sheet type. Furthermore, the data transmission/reception unit 409 performs decoding processing for the JPEG file included in the print data to convert the JPEG file into image data, and sends the converted image data to the print processing unit 408.

In this example, at the time of normal printing, if the print setting information includes correction processing information, image correction processing can he executed for the image data. Examples of the image correction processing include known image processing such as hack-light correction and red-eye correction assuming photo print in addition to brightness adjustment, contrast adjustment, and color balance adjustment. Note that when printing an image embedded with additional information, the image processing may cause erasure or loss of the embedded information, and thus execution of the image correction processing can be suppressed. If the above-described image correction processing is executed, the image correction processing is preferably executed before the application 400 generates print data (embeds additional information).

The print processing unit 408 converts the image data received from the data transmission/reception unit 409 into ink color data by performing color separation so as to output the image data in preferable color at the time of outputting from the printer 112. As conversion into ink color data, one of known color conversion processes of converting an image format (RGB) used for screen display into ink colors (CMYK) for printing may be performed.

Assume, for example, four colors of cyan (C), magenta (M), yellow (Y), and black (K) as ink colors of the printer 112. The print processing unit 408 converts input data formed from three colors of red (R), green (G), and blue (B) into ink color data of four colors of C, M, Y and K. At the time of conversion, a color separation table can be used. The color separation table is a three-dimensional lookup table that receives input of three values of R, G, and B and converts them into the values of ink colors of C, M, Y, and K. In this way, the print processing unit 408 converts the R, G, and B values into the values of ink colors of C, M, Y, and K using the color separation table for each pixel of the input image data.

Furthermore, the print processing unit 408 can perform image processing such as output tone correction or halftoning using an image processing parameter set in a lookup table or the like, thereby converting the ink color data into printout data.

The converted printout data is transmitted to the control circuit unit 203. The control circuit unit 203 discharges inks to the print medium 204 based on the thus obtained printout data to form an image. By performing the above steps, the print processing of the print data ends.

The thus obtained printed product (the print medium 204 on which the image is completely formed) is embedded with the additional information. The additional information reading module 407 of the application 400 has a function of performing processing of reading out and extracting the additional information from the printed product embedded with the additional information. The additional information extraction processing will be described in detail later.

Note that in the example shown in FIG. 4, the application 400 can embed and read out the additional information. However, the additional information may be embedded and read out by different applications, respectively.

<Additional Information Embedding Processing>

FIG. 11 is a flowchart illustrating embedding processing, performed by the application 400 (mainly by the print data generation module 405), of embedding the additional information in the rendered image data. In short, this flowchart shows details of step S907 of FIG. 9. In S1101, the print data generation module 405 converts the additional information into binary data. Consider a case in which a character string of "hello" is input as an example of the additional information. Binary data includes pieces of information of "0" and "1", and can have a specific meaning by continuously arranging the pieces of information. The correspondence between binary data and characters is defined by a code also called a "character code". According to, for example, "Shift JIS" as an example of the character code, "h" can correspond to binary data of "01101000". Similarly, "e" can correspond to "01100101", "l" can correspond to "01101100", and "o" can correspond to "01101111".

That is, the characters of "hello" can be expressed by binary data of "0110100001100101011011000110110001101111". On the other hand, if binary data of "0110100001100101011011000110110001101111" is acquired, characters of "hello" are acquired. As described above, the additional information is embedded by embedding binary data so as to determine "0" or "1".

Figure 12A:
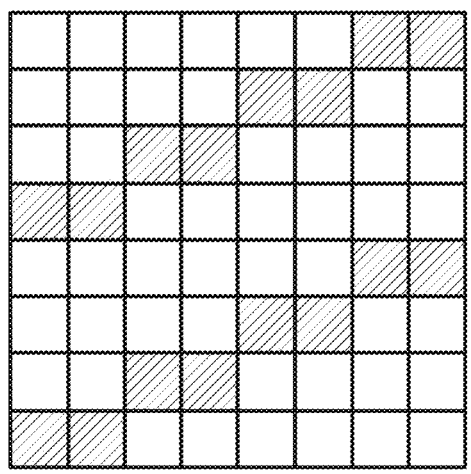
FIG. 12A is a view showing an embedded pattern.
Figure 12B:
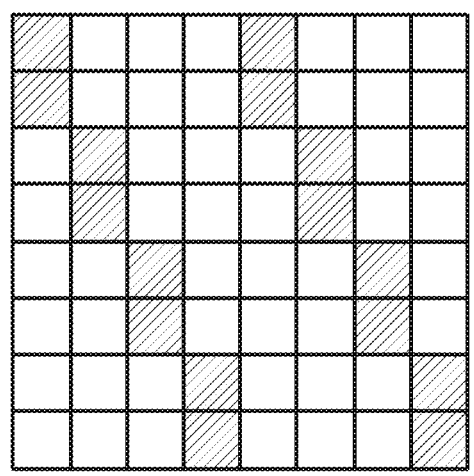
FIG. 12B is a view showing an embedded pattern.

FIGS. 12A and 12B show some examples of a method of embedding information of binary data "0" or "1" in the image.

A pattern shown in FIG. 12A represents binary data "0", and a pattern shown in FIG. 12B represents binary data "1". Each pattern is formed by 8 px×8 px (one rectangle in each of FIGS. 12A and 12B indicates 1 px (one pixel)). The print data generation module 405 embeds, in the image, the additional information formed by the binary data "0" and "1" using these patterns, and superimposes or applies the pattern having periodicity (or the periodic pattern) on an 8×8 region in the image.

As an example of the method of embedding the pattern in the image, for example, a method of superimposing the pattern having periodicity directly on the RGB values luminance information) is considered. As another example, the RGB values may be separated into another color space information (for example, CIE L*a*b* or YCrCh signals) such as luminance-color difference information, thereby implementing the embedding processing. As still another example, the RGB values may be separated into ink colors (for example, CMYK signals), thereby implementing the embedding processing.

In this embodiment, for the sake of descriptive simplicity, a method of superimposing the pattern having periodicity on the B component of the RGB components is adopted. Assume that each component is represented by 8 bits (0 to 255). In embedding the pattern in the image, processing of subtracting, for example, 30 from the pixel value (B value) of the B component is performed for a hatched pixel portion in each of FIGS. 12A and 12B.

In addition, it is more preferable that there is a pixel portion to be added. If the number of pixel portions to be subtracted is substantially equal to the number of pixel portions to be added, a sense of incongruity for the image obtained after the additional information is embedded can be reduced.

Figure 12C:
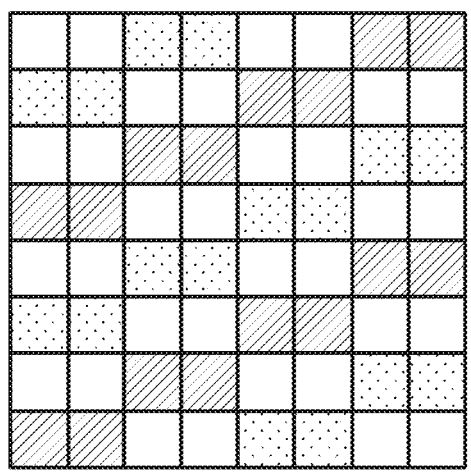
FIG. 12C is a view showing an embedded pattern.
Figure 12D:
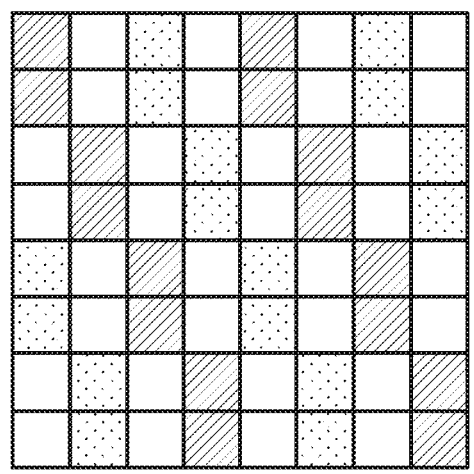
FIG. 12D is a view showing an embedded pattern.

FIGS. 12C and 12D each show a pattern when the pixel portions to be subtracted and the pixel portions to be added are mixed (the added pixel portion is hatched more lightly than the subtracted pixel portion). In this way, the additional information is embedded by performing processing using a predetermined pattern for one of the RGB data of the image to be embedded with the additional information.

If the pattern having periodicity is superimposed and embedded in the image, the pattern is embedded with the period of the pattern (or the amplitude change of the color) that is difficult to exist in nature. For example, this embodiment assumes that the B component increases/decreases. However, the pattern in which the B component increases/decreases with a relatively high period is difficult to exist in nature. By embedding the additional information in this way, it is possible to reduce interference between the original image and the embedded signal, which can occur when reading the additional information.

Instead of or in addition to this, it is considered to perform, in advance, filtering processing for the image to be embedded with the additional information with respect to a frequency corresponding to the period of the pattern to be superimposed. This can be implemented using a known filter, and can be implemented, as an example, by filtering processing using an FFT (Fast Fourier Transform) filter. That is, when inverse FFT is executed by executing FFT for the image to be embedded with the additional information to convert the image into an image in a spatial frequency domain, and performing filtering processing with respect to the frequency corresponding to the pattern to be superimposed, an image having undergone the filtering processing with respect to the specific frequency can be obtained. By embedding the additional information in the thus obtained image, it is possible to reduce the interference which can occur when reading the additional information.

Figure 13:
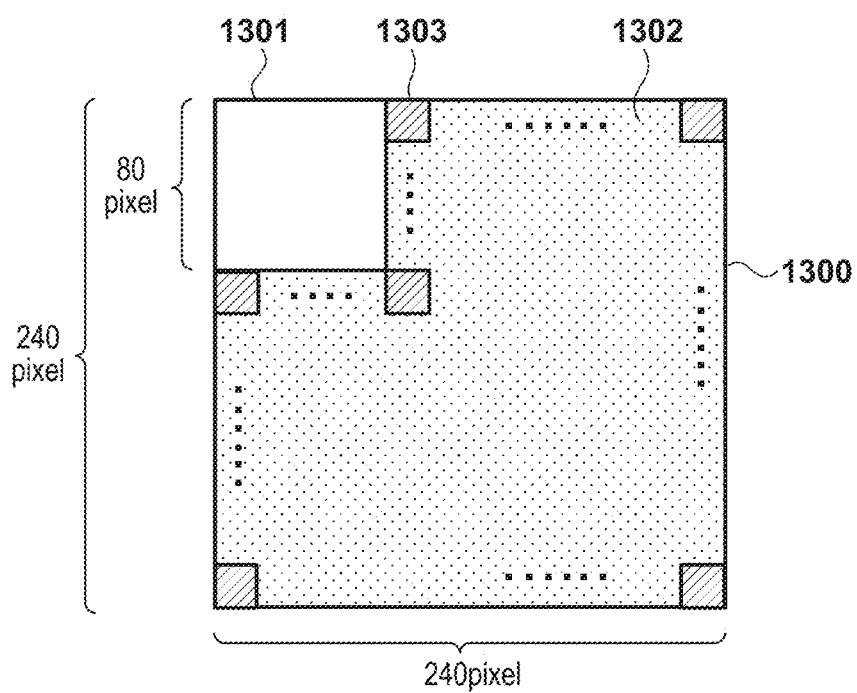
FIG. 13 is a view showing an example of the arrangement of a unit block.

FIG. 13 shows a unit block (multiplexed block) of the additional information according to this embodiment. According to this embodiment, the embedded additional information is acquired by reading all pieces of information in a unit block 1300. in this embodiment, the unit block 1300 is formed by 240 px×240 px including a marker portion 1301 and a data portion 1302.

The marker portion 1301 is a block of 80 px×80 px used to specify the position of the unit block 1300 when reading the additional information, and is embedded with information indicating the marker portion 1301. As the information indicating the marker portion 1301, in this example, a specific pattern formed by a combination of FIGS. 12A and 12B is applied, and this pattern can be detected to specify the marker portion 1301. As another method, it is possible to form the marker portion 1301 by a pattern having periodicity (or a period direction) different from that in each of FIGS. 12A and 12B.

Note that when error correction data or error detection data is included in the data of the marker portion 1301 of 100 bits, a reading error or loss of data when reading the additional information may be detected and modified. As an example of an error correction method, a Reed-Solomon Code, a Golay code, or the like can be used. As an example of an error detection method, CRC (Cyclic Redundancy Check) or the like can he used.

In the data portion 1302, a pattern 1303 (that is, the binary pattern representing "0" or "1") shown in FIG. 12A or 12B is arranged. In this embodiment, 800 patterns 1303 are arranged in the data portion 1302. One pattern 1303 can represent information of 1 bit. Therefore, the entire block 1300 includes an information amount of 800 bits. Similar to the binary data of the marker portion 1301, error correction data or error detection data may be provided for the binary data of 800 bits.

Note that the marker portion 1301 is arranged in the upper left portion of the unit block 1300 in this embodiment but may be arranged at another position such as an upper right portion or a central portion. Furthermore, the marker portion 1301 may be provided in a shape other than a rectangle, or may be dispersedly arranged in the unit block.

Figure 14:
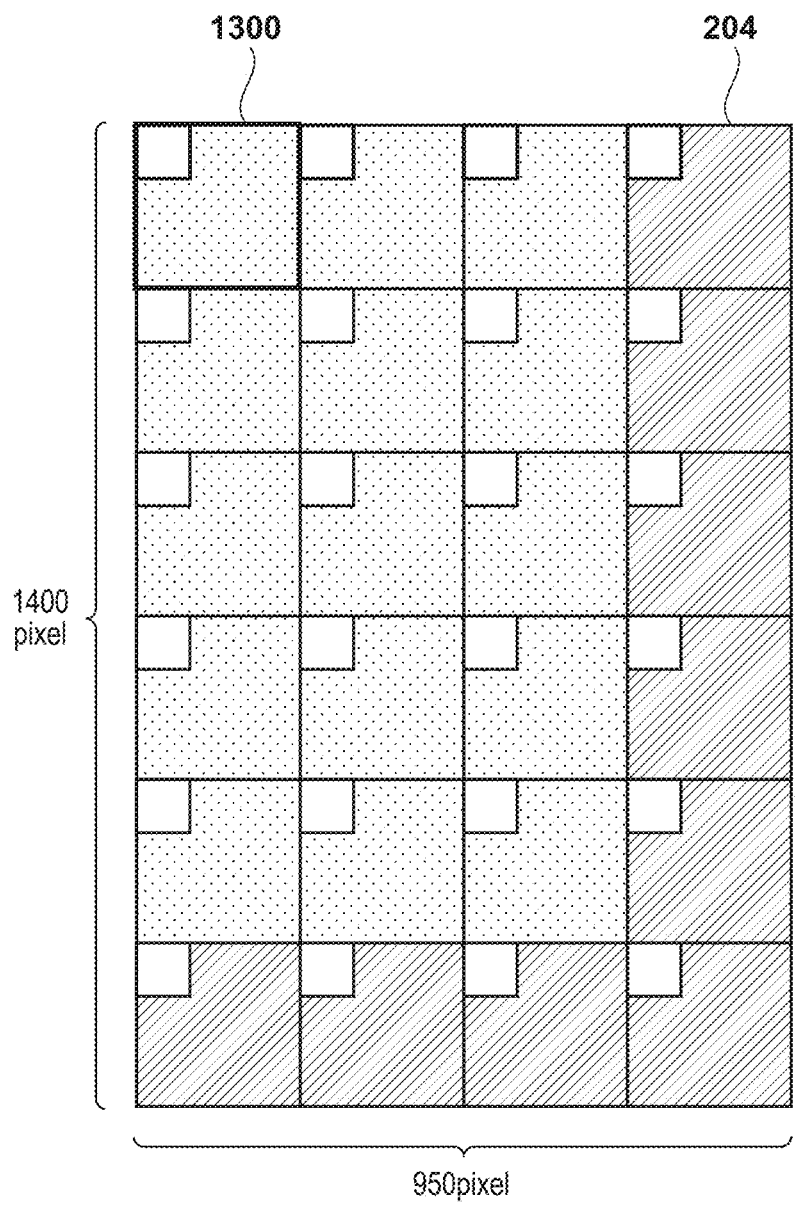
FIG. 14 is a view showing an example of embedding of unit blocks in a printed product.

FIG. 14 shows the print medium 204 in which the unit block 1300 is repeatedly embedded. According to this embodiment, the unit block 1300 representing the same additional information is repeatedly embedded in the entire surface of the print medium 204. Note that as print settings, L size, 300 dpi printing, and bordered printing are set.

In this embodiment, by the processing in S902, the print image size in this case is a width of 950 px×a height of 1400 px. Therefore, the unit blocks 1300 of 240 px×240 px can be arrayed in 3 rows×5 columns (15 blocks in total can be arrayed). To read the additional information embedded in the print medium 204, the data portion 1302 of one of the plurality of repeatedly embedded unit blocks 1300 is read.

Note that by embedding the same information (unit block 1300) in the entire surface of the print medium 204, it is possible to improve the robustness when reading the additional information. The reason for this is that even if the additional information cannot be read in a given unit block 1300, it may be possible to read the additional information in another unit block 1300.

Note that the case in which the same information (it block 1300) is repeatedly embedded is exemplified here but the present invention is not limited to this. Different pieces of information (blocks of different contents) may be embedded in the entire surface of the image. Referring to FIG. 14, there are areas whose block sizes are insufficient in the right and lower portions of the print medium but part of the block can be embedded in each of these areas.

Referring back to FIG. 11, in S1102, the print data generation module 405 decides the layout of the unit blocks

1300. The print data generation module 405 arrays the unit blocks 1300 by setting the upper left position of the print image as a start point. In the above-described example of FIG. 14, the unit blocks 1300 are arranged by setting the upper left position of the print image as a start point.

In S1103, the print data generation module 405 embeds the additional information in the image in which the blocks 1300 are arrayed in the decided layout. The additional information is embedded by superimposing the pattern shown in FIG. 12A or 12B on each pixel while associating the image to be embedded with the additional information with the layout of the blocks 1300 shown in FIG. 14. More specifically, the data portion 1302 in each block 1300 in FIG. 14 is formed by the pattern shown in FIG. 12A or 12B. Therefore, the above-described subtraction processing (processing of subtracting 30 from the B value) is performed for the hatched pixel portion in each pattern. If the B value is smaller than 0, the pixel value after the subtraction processing is set to 0. By applying this processing to the entire image, embedding of the additional information in the image is complete.

As described above, the additional information is embedded in the image, and then the printer 112 can execute printing. The pattern shown in each of FIGS. 12A to 12D can also be represented as an embedded pattern.

<Embedded Signal Strength of Additional Information>

Next, the embedded signal strength associated with the ease of implementation of reading of the additional information when reading the additional information will be described. In the above description, the example of forming a periodic pattern by performing subtraction from (additionally, addition to) the B value in the additional information embedding processing has been explained. However, if the B value becomes smaller than 0 or exceeds 255 by subtraction or addition, the B value is limited to 0 or 255. This decreases the amplitude amount of the color. Therefore, in this example, if the B value falls within the range of 0 to 29 or the range of 226 to 255, the embedded signal strength decreases. In the color gamut of white of R value=G value=B value=0 and a color gamut close to it, a white portion is unwantedly colored by addition to the B value (the R value indicates the pixel value of the R component and the G value indicates the pixel value of the G component). Therefore, in embedding the additional information, for the color gamut of white and the color gamut close to it, in many cases, the embedded signal strength is made low and the above-described subtraction or addition operation is not performed (or a subtraction amount or addition amount is decreased). Since the additional information is easy to read when the embedded signal strength is low, and the additional information is difficult to read when the embedded signal strength is high, an area where the additional information is easy to read and an area where the additional information is difficult to read are generally mixed in the printed product.

Figure 16:
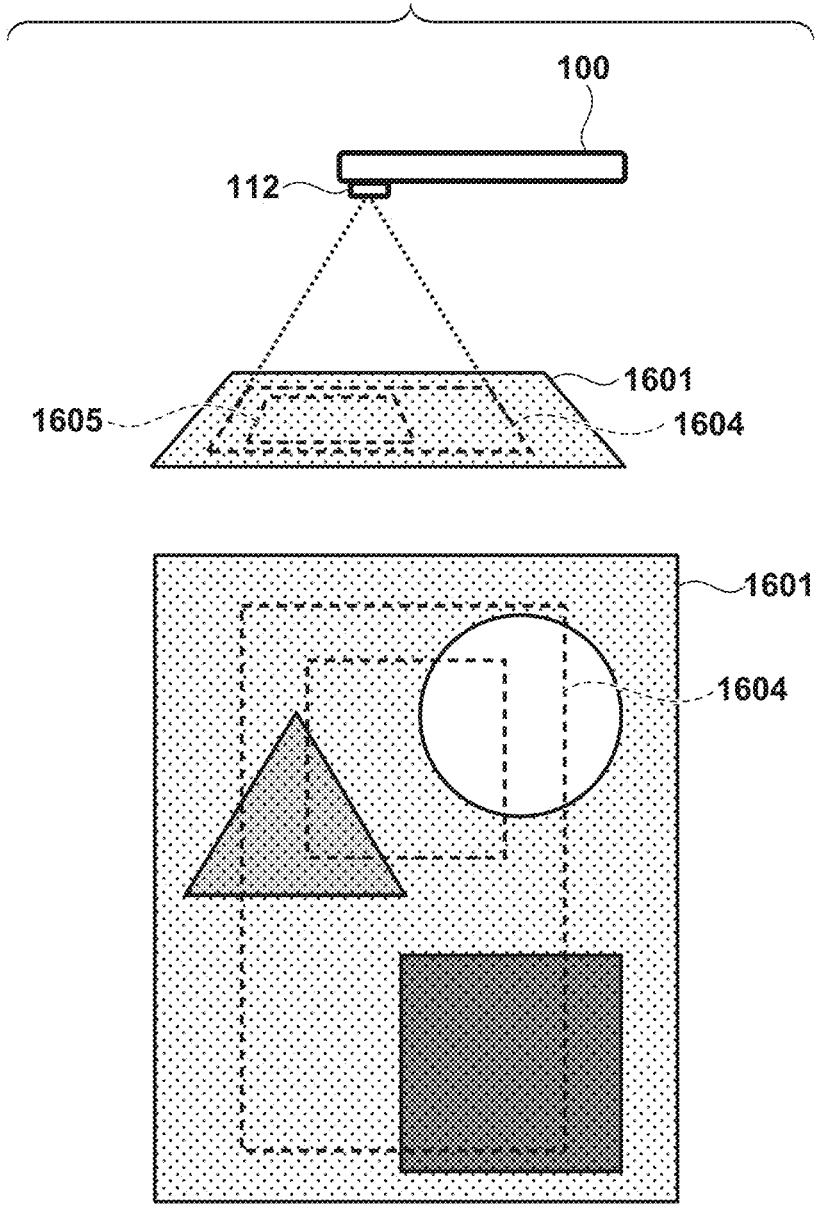
FIG. 16 is a view showing an example of a captured image and a marker detection area when reading the printed product.

FIG. 16 shows an example of image data of a printed product 1601 indicating the magnitude of the embedded signal strength. In FIG. 16, a lighter color represents a lower embedded signal strength, and a darker color represents a higher embedded signal strength.

<Additional Information Reading Processing>

Processing of reading the additional information from the printed product will be described next. The additional information reading processing is executed by the additional information reading module 407 (see FIG. 4) of the application 400 but may be performed by an application of another apparatus.

Figure 15:
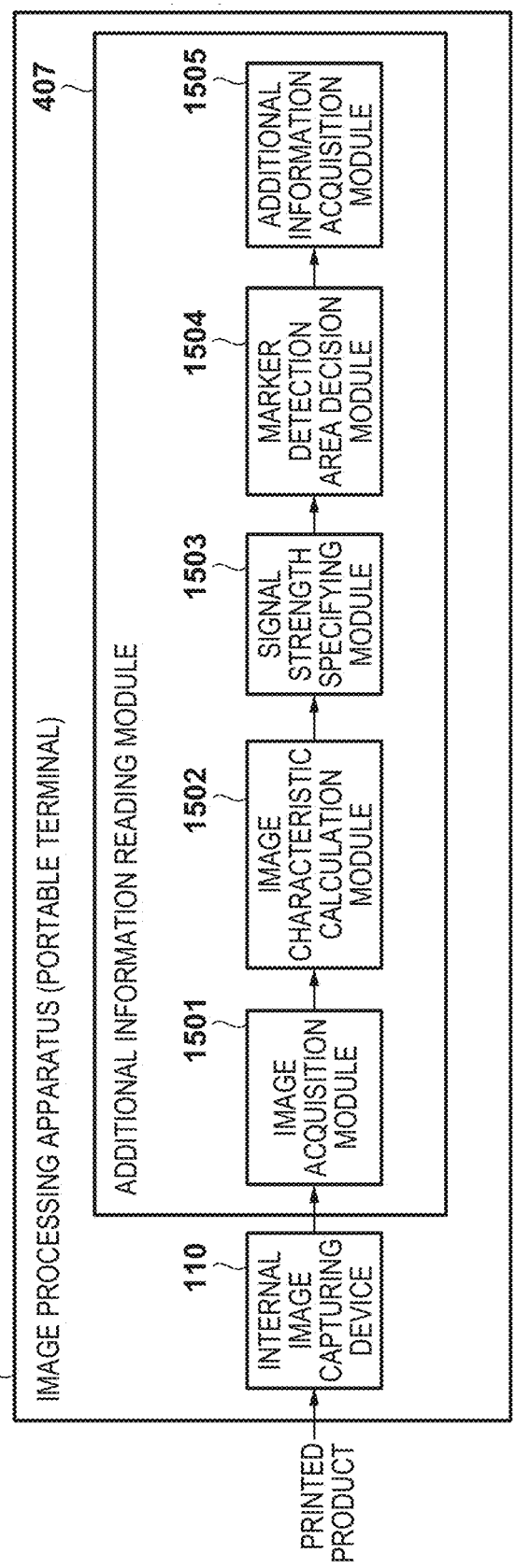
FIG. 15 is a block diagram including an additional information reading module.

FIG. 15 is a block diagram showing an example of the arrangement of the image processing apparatus 100 for performing the additional information reading processing. The additional information reading module 407 included in the application 400 of the image processing apparatus 100 includes an image acquisition module 1501, an image characteristic calculation module 1502, signal strength specifying module 1503, a marker detection area decision module 1504, and an additional information acquisition module 1505.

The image acquisition module 1501 controls the internal image capturing device 110 to capture the printed product 1601 embedded with the additional information, thereby acquiring the image data of the printed product 1601. The image data may be still image data, and still image data extracted from moving image data acquired at a predetermined frame rate may be used. The thus obtained image data is sent to the image characteristic calculation module 1502. The image data is obtained as 8-bit data in the RGB format, and has a size of 1080×1920 (2 K).

FIG. 16 shows an example of the image data obtained as described above. As shown in FIG. 16, the internal image capturing device 110 of the image processing apparatus 100 captures the printed product 1601 embedded with the additional information, thereby acquiring image data of an image capturing area 1604. The additional information is acquired by analyzing a marker detection area 1605 in the image capturing area 1604. To reduce the calculation amount, the additional information is acquired not in the entire image capturing area 1604 but in a partial area.

The image characteristic calculation module 1502 acquires image characteristics from a plurality of small areas in the image data of the printed product 1601. To calculate the image characteristics, spatial frequency information obtained by frequency analysis can be used.

Figure 17A:
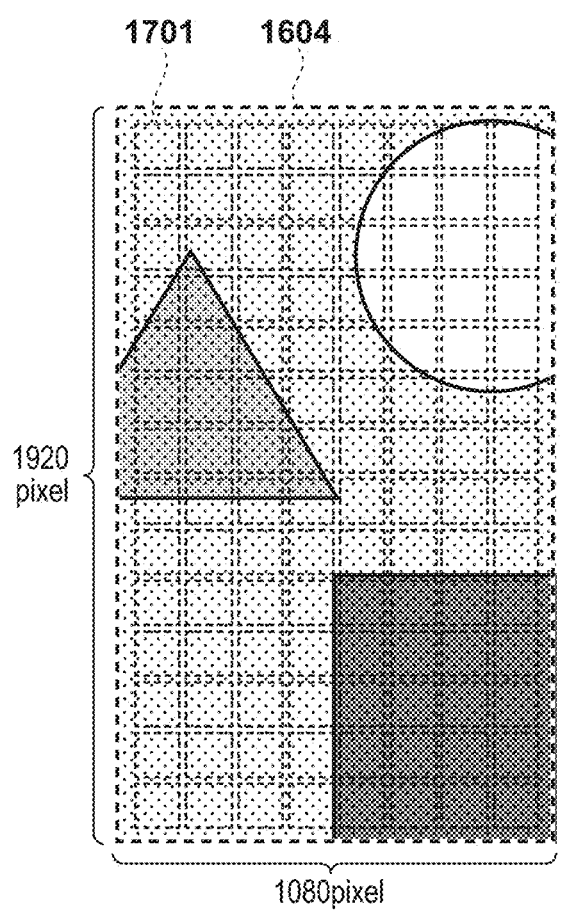
FIG. 17A is a view showing an example of a plurality of small areas in the captured image.

FIG. 17A is an explanatory view showing the above-described frequency analysis. A plurality of small areas 1701 arranged in the image capturing area 1604 in FIG. 17A are used for frequency analysis.

Figure 18:
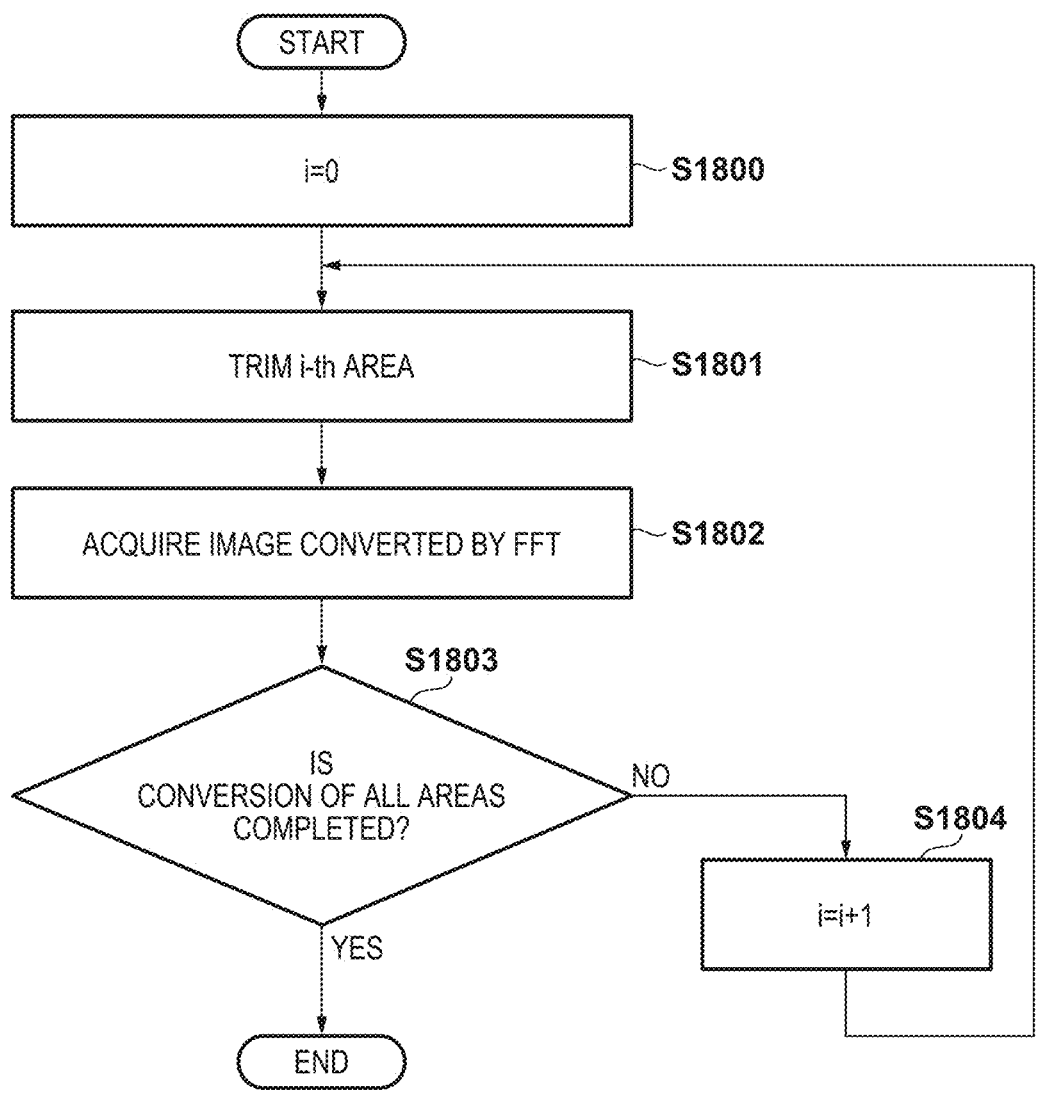
FIG. 18 is a flowchart illustrating an example of calculation of image characteristics.

FIG. 18 is a flowchart illustrating an example of an image characteristic calculation method. In S1800, a parameter i=0 is set.

In S1801, trimming processing of the plurality of small areas 1701 is performed. The small area 1701 is set as an analysis size to perform trimming processing with a size of 128 px×128 px. This embodiment assumes that analysis is performed with a size of 128 px×128 px but the present invention need not be limited to this. However, for processing of performing conversion into the spatial frequency domain (to be described later), a size of a power of two (for example, 64 px×64 px or 256 px 256 px) is preferably used.

In S1802, conversion processing of converting the trimmed image obtained in S1801 into the spatial frequency domain is performed, and two-dimensional FFT is performed in this embodiment. The thus obtained image is represented as an FFT image. Note that a known technique is used as the algorithm of FFT.

Figure 19A:
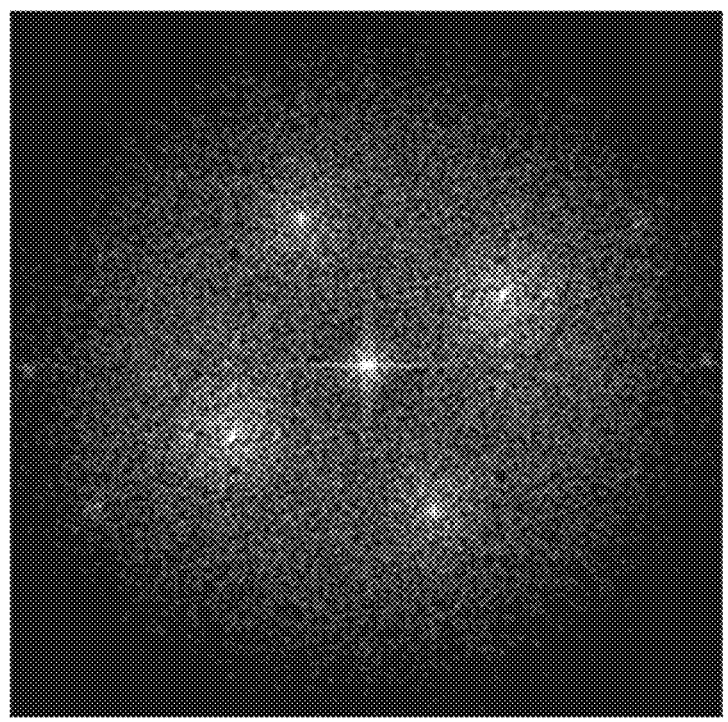
FIG. 19A is a view showing an example of analysis in a spatial frequency domain.

FIG. 19A shows an example of an FFT image actually obtained by converting part of the image data into the spatial frequency domain. When the center of the image is set as the origin, the abscissa represents the frequency in the horizontal direction, the ordinate represents the frequency in the vertical direction, and the frequency rises as it moves apart from the origin. The FFT image shown in FIG. 19A is an image in which the sum of the absolute values of the real part and imaginary part is obtained for each pixel corresponding to each frequency, and normalized using the maximum value and the minimum value (zero), and the obtained value is set as the pixel value of each pixel. Normalization is performed between 0 and 255 (maximum value), thereby obtaining a monochrome 8-bit image. The thus obtained monochrome 8-bit FFT image is used as information representing the image characteristics of the small areas 1701.

In S1803, it is determined, based on the parameter i, whether calculation of the image characteristics of all the areas is complete. If calculation is incomplete, 1 is added to the parameter i in S1804, and the process returns to S1801 to calculate the image characteristic of the next area. If calculation of the image characteristics of all the areas is complete (the parameter i reaches a predetermined value), the FFT images are transmitted as the image characteristics to the signal strength specifying module 1503.

The signal strength specifying module 1503 calculates a feature amount for each small area 1701 using the characteristic information (FFT image) of the small area 1701 obtained by the image characteristic calculation module 1502, and specifies or estimates the embedded signal strength and the embedding position of the additional information based on relative comparison of the feature amounts. Note that the signal strength specifying module 1503 may be referred to as the signal strength estimation module 1503 or may simply be referred to as the specifying module or the estimation module.

As shown in FIG. 16, the image data of the printed product 1601 includes the above-described two embedded patterns (see FIGS. 12A and 12B) embedded in the printed product 1601. Therefore, if a portion trimmed from the image data is converted into the spatial frequency domain, there are the peaks of power spectra at frequencies corresponding to the periodicities (or period directions) of the two embedded patterns. The FFT image has the peaks of the same power spectra on the opposite side with respect to the origin. As will be apparent from FIG. 19A, in the spatial frequency domain, there are the four peaks of the power spectra in addition to the DC component in the central portion.

As the feature amount of each small area 1701, the calculated value (for example, the average value or the maximum value) of the power spectra of the small area 1701 may be used. In this case, however, a component (for example, a component having periodicity included in the current image) different from the embedded patterns may be mixed as noise. To cope with this, in this embodiment, the components of the peaks (additionally, components close to the peaks) of the power spectra of the embedded patterns are extracted and used as the feature amount. Note that the peaks of the power spectra can simply be referred to as the peaks in the following description.

Figure 19B:
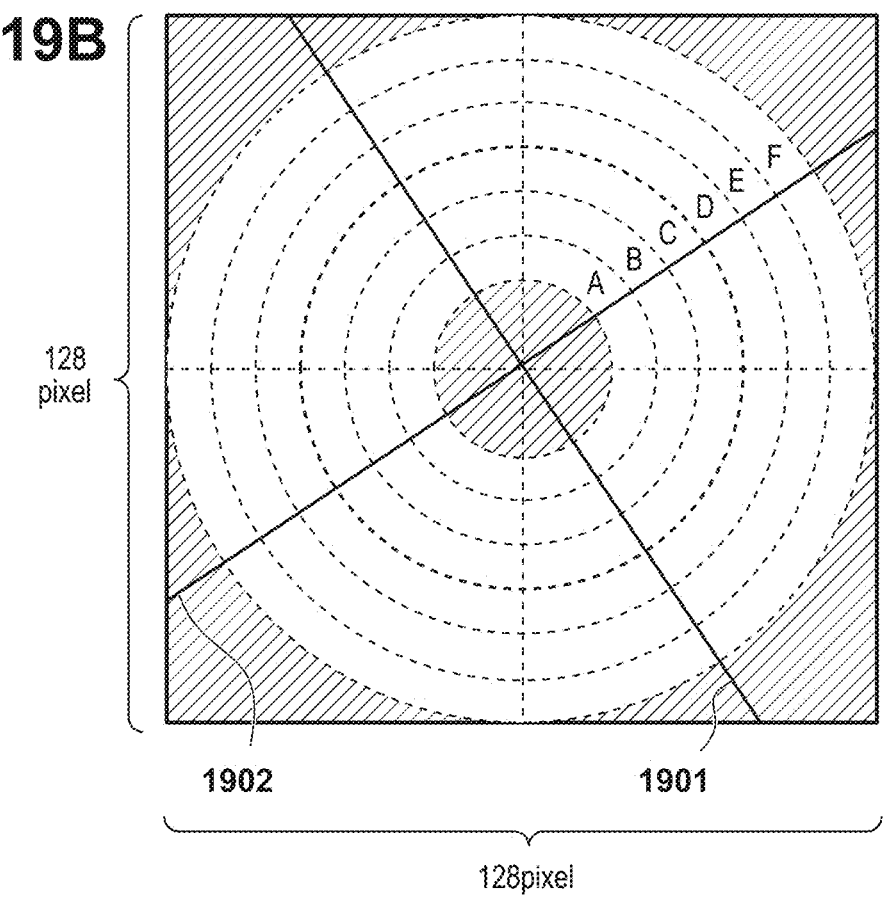
FIG. 19B is a view showing an example of analysis in the spatial frequency domain.

FIG. 19B shows another example of the division form of the small areas in the FFT image, if no tilt (rotation) occurs between the internal image capturing device 110 and the printed product 1601, the peaks corresponding to the embedded patterns appear on lines 1901 and 1902. However, the frequencies at which the peaks appear vary depending on the distance between the internal image capturing device 110 and the printed product 1601. For example, if the distance is short, the peaks appear on the low frequency side, and if the distance is long, the peaks appear on the high frequency side. In the example shown in FIG. 19B, six small areas A to F are set in a ring shape from the low frequency side by excluding a low-frequency region near the origin.

In this example, which of the ring-shaped small areas includes the above-described peaks is determined. For example, the maximum value of the power spectra included in each of the plurality of small areas is obtained, and one of the plurality of small areas which has the largest maximum value is determined as the small area where the peaks exist. Alternatively, the average value of the power spectra included in each of the plurality of small areas is obtained, and one of the plurality of small areas which has the largest average value may be determined as the small area where the peaks exist.

Figures 19C, 19D:
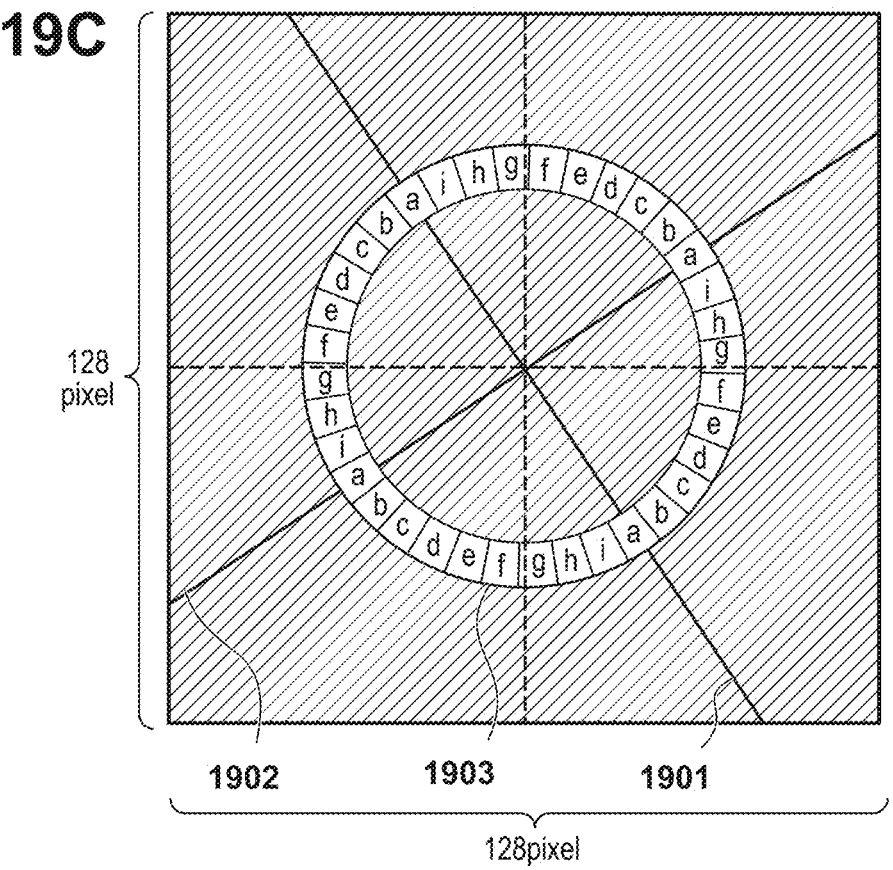
FIG. 19C is a view showing an example of analysis in the spatial frequency domain.
FIG. 19D is a view showing. an example of analysis in the spatial frequency domain.

Next, the peaks corresponding to the tilt (rotation) are extracted. If a tilt (rotation) occurs between the internal image capturing device 110 and the printed product 1601, the peaks appear by rotating their positions among the positions a to i, as shown in FIG. 19C. That is, the lines 1901 and 1902 are rotated. Note that the positions a to i are arranged at an interval of 10°.

As an example, consider a case in which the peaks are detected in the area C among ring-shaped small areas 1903 (areas A to F). If no tilt (rotation) occurs, the four peaks in the small area 1903 appear at the positions a. To the contrary, if the tilt (rotation) occurs at 10° in the counterclockwise direction, the peaks appear at the positions b. Similarly, if the tilt (rotation) occurs at 30° in the clockwise direction, the peaks appear at the positions g.

As described above, by detecting the positions of the peaks, it is possible to determine the tilt (rotation). More specifically, the average value X of the power spectra included at the positions a, b, c, d, e, f, g, h or i is calculated and it is determined that the tilt corresponding to the positions at which the average value X is largest occurs. This average value X can be used as the above described feature amount.

Note that in this embodiment, after determining the ring-shaped small area 1903, the tilt is determined. This can reduce erroneous detection of the tilt when the peaks of locally strong power spectra occur as noise outside the ring-shaped small area 1903.

Figure 17B:
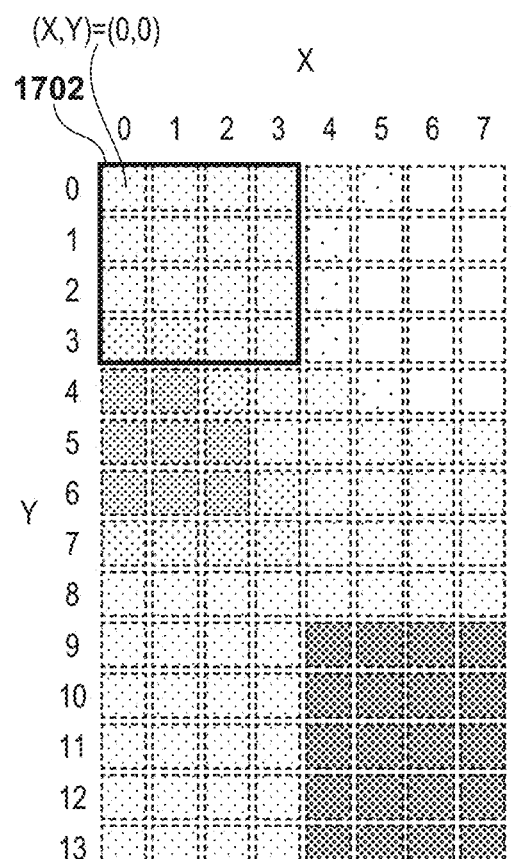
FIG. 17B is a view showing an example of the plurality of small areas in the captured image.

FIG. 17B shows the result of calculating the feature amount for each small area 1701 shown in FIG. 17A. Since the small area 1701 having a darker color has a higher embedded signal strength, the numerical value of the feature amount is higher. Since the small area 1701 having a lighter color has a lower embedded signal strength, the numerical value of the feature amount is lower. That is, based on the position of each small area 1701 and its feature amount, it is possible to specify the embedded signal strength and the embedding position of the additional information. In this example, the small areas 1701 included in a circle in an upper right portion each have a relatively low embedded signal strength, and the small areas 1701 included in a rectangle in a lower right portion each have a relatively high embedded signal strength.

Pieces of information respectively indicating the specified embedding position and embedded signal strength will be referred to as embedding position information and embedded signal strength information, respectively, hereinafter. In this embodiment, the embedded signal strength stored in a two-dimensional array INFO[X][Y] is used. The signal strength is represented by an integer of 0 to 255, and X and Y are index values corresponding to the coordinate values in the horizontal and vertical directions of each small area 1701 shown in FIG. 17B. The embedding position information and the embedded signal strength information are transmitted to the marker detection area decision module 1504.

The marker detection area decision module 1504 decides the position of the marker detection area 1605 in the image capturing area 1604 shown in FIG. 16 based on the embedding position information and the embedded signal strength information. More specifically, the position of the marker detection area 1605 is decided so that the average value of the embedded signal strengths of the small areas 1701 included in the marker detection area 1605 is largest.

Figure 20:
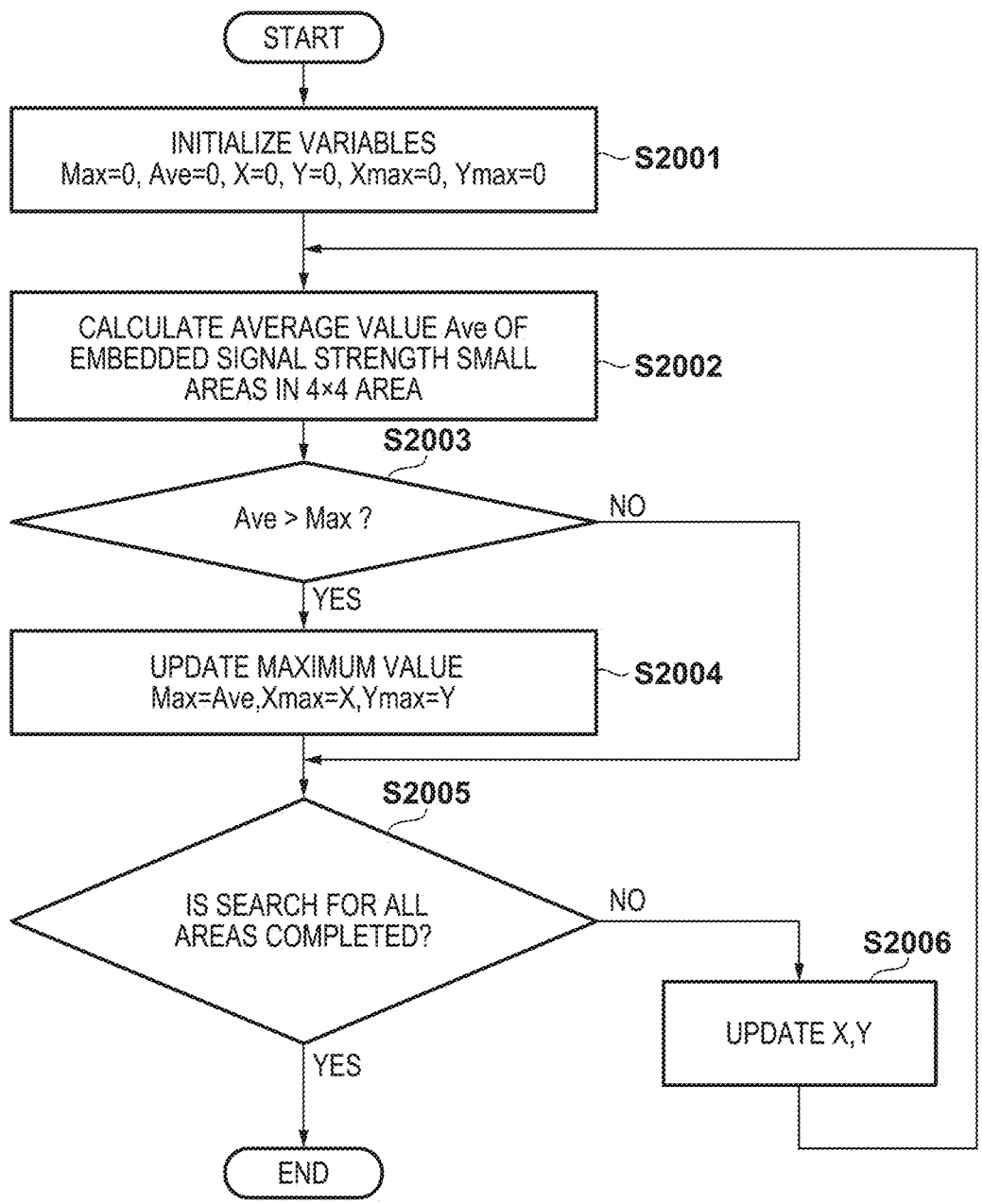
FIG. 20 is a flowchart of processing of deciding the position of the marker detection area.

FIG. 20 is a flowchart illustrating an example of a method of deciding the position of the marker detection area 1605. For the sake of simplicity, assume that the marker detection area 1605 has a size obtained by arraying the small areas 1701 in 4 rows×4 columns, and a margin between the small areas 1701 is set to 0. That is, the marker detection area 1605 has a size of 512 px×512 px, In S2001, variables (Max, Ave, X, Y, Xmax, and Ymax) are initialized. The variable Max is a variable that stores the maximum value of the embedded signal strengths, and has an initial value of 0. The variable Ave is a variable that stores the average value of the embedded signal strengths, and has an initial value of 0. The variables X and Y are variables corresponding to the coordinate values in the horizontal and vertical directions of each small area 1701 in the image capturing area 1604, and have initial values of 0. Note that in FIG. 17B, the small area 1701 located in the upper left portion of the image capturing area 1604 has X=0 and Y=0, and the small area 1701 located in the lower right portion of the image capturing area 1604 has X=7 and Y=13. The variables Xmax and Ymax are variables that store the X value and the Y value with which the highest embedded signal strength is obtained, and have initial values of 0.

In S2002, the average value Ave of the embedded signal strengths INFO[X][Y] of small areas 1701 arranged in 4 rows×4 columns is calculated by setting the variables X and Y as the start point of the upper left portion.

In S2003, the average value Ave is compared with the maxim value Max. If the average value Ave is larger than the maximum value Max, the process advances to S2004. Since the initial value of the maximum value Max is 0, it is firstly determined that the average value Ave is larger than the maximum value Max as long as the average value Ave is not 0. If the average value Ave is equal to or smaller than the maximum value Max, the process advances to S2005.

In S2004, the maximum value Max is updated. The average value Ave is stored in the maximum value Max, and the coordinate values X and Y at this time are stored in the variables Xmax and Xmax, respectively. After that, the process advances to S2005. By performing S2002 to S2004, the search is complete for the single small areas 1701.

In S2005, it is determined whether the search is complete for the entire marker detection area 1605. In this example, when X=4 and Y=10, the search is complete. If the search is complete, this flowchart ends; otherwise, the coordinate values X and Y are updated and the process returns to S2002. With respect to the coordinate values X and Y, for example, the coordinate value X is incremented by one, and when X=4 as the right end of the search is exceeded, the coordinate value X is returned to 0 and the coordinate value Y is incremented by one. In the search, the order of incrementing the coordinate values X and Y may be reversed.

As described above, the positions of the coordinate values X and Y at which the average value Ave of the embedded signal strengths of the small areas 1701 included in the marker detection area 1605 is largest are obtained as the variables Xmax and Ymax, respectively. These variables Xmax and Ymax are converted in the coordinate system in the image capturing area 1604 and then decided as the position of the marker detection area 1605. In this example, the variables Xmax=4 and Ymax=9 are obtained and the position of the marker detection area 1605 in the image capturing area 1604 is represented by x=512+α and y=1152+β. At this time, x and y represent the coordinates when the upper left coordinates of the image capturing area 1604 are set as x=0 and y=0. Note that α and β are offset amounts for correcting deviations between the upper left coordinates in FIG. 17B and the upper left coordinates of the image capturing area 1604 in FIG. 17A.

In this example, the offset amount α is α=28 px obtained by dividing, by 2, 56 px obtained by subtracting 128 px×8=1024 px from 1080 px as the size in the horizontal direction of the image capturing area 1604. Similarly, the offset amount β is β=64 px obtained by dividing, by 2, 128 px obtained by subtracting 128 px×14=1792 px from 1920 px as the size in the vertical direction. Therefore, the position of the marker detection area 1605 is represented by x=540 px and y=1216 px.

The above description has exemplified the form in which the marker detection area 1605 is searched while shifting by 128 px as the size of the small area 1701, and a position at which the embedded signal strength is highest is found. However, the size of the marker detection area. 1605 need not always be a multiple of the size of the small area 1701, and the search may be performed while shifting by 1 px. Note that there may be a case in which no entire small area 1701 is included in the marker detection area 1605. In this case, the embedded signal strength of the entire marker detection area 1605 is calculated based on the area ratio of the portion of the small area 1701 included in the marker detection area 1605.

In this embodiment, the position of the marker detection area 1605 is decided so that the average value of the small areas 1701 included in the marker detection area 1605 is largest. However, instead of the average value, another calculated value (for example, a median or maximum value) may be used.

The additional information acquisition module 1505 executes marker detection for the marker detection area 1605 decided by the marker detection area decision module 1504, thereby controlling to acquire the additional information.

First, marker position detection will be described. In this embodiment, the two patterns shown in FIGS. 12A and 12B are embedded in the image. In the embedding example, 30 is subtracted from the B component of the RGB components. Thus, the patterns shown in FIGS. 12A and 12B show relatively large power spectra in two specific directions, This is apparent from FIGS. 19A and 19B. In a local area of 8 px×8 px, the additional information acquisition module 1505 detects the power spectra, thereby extracting data of "0" or "1". Note that as preprocessing of the detection processing, edge detection or sharpness processing is performed, thereby making it possible to emphasize the power spectra.

When extracting the data by frequency analysis, it is necessary to correctly extract a marker from the marker detection area 1605 of the image data. Particularly, for image capturing using a portable terminal such as a smartphone, the image capturing distance is difficult to be constant, and thus processing for correctly extracting the pattern of 8 px×8 px shown in FIG. 12A or the like by correcting the distance is performed. An example of the correction method is analysis of the above-described ring-shaped small areas 1701 (see FIG. 19B). After converting the marker detection area 1605 into the spatial frequency domain by FFT the small area 1701 where the peaks are detected is determined by the analysis of the ring-shaped small areas 1701. Based on the relationship between the image capturing distance corresponding to the determined ring-shaped small area 1701 and the image capturing distance as a reading reference, the enlargement/reduction rate of the image is calculated, and then the subsequent processing is performed for the enlarged/reduced image. The above correction processing is executed as preprocessing for the captured image. As another embodiment, the image of the marker detection area 1605 can be enlarged/reduced at preset enlargement/reduction rates in a plurality of stages, and then the subsequent processing can be performed.

Processing of correcting a deviation of the coordinate position is performed next. As an example of the method, extraction of an area of 8 px×8 px from the image and frequency analysis are repeatedly performed while shifting by 1 px in the horizontal and vertical directions (that is, 64 times of 8 times in the horizontal direction×8 times in the vertical direction), and a portion where the power spectrum is strongest is set as the reference position of extraction.

After the completion of the detection of the reference position of extraction, marker detection is performed. In the example shown in FIG. 13, to perform marker detection, the marker portion 1301 of the unit block 1300 termed from the specific binary patterns is detected. In the marker portion 1301, 100 patterns of 8 px×8 px shown in FIG. 12A or 12B are arranged in 10 rows×10 columns in accordance with a predetermined rule. Then, it is inspected whether this pattern exists in the marker detection area 1605 (that is, whether it is possible to acquire a sequence of "0" and "1" for 100 bits). More specifically, data extraction of the 100 patterns is executed while shifting the position in the marker detection area 1605 by 8 px, thereby detecting a portion coinciding with the pattern. Note that if 100 bits include the above-described error detection data or error correction data, error detection or error correction is performed for the acquired data.

After the marker portion 1301 is detected, the additional information is extracted (or separated) from the data portion 1302 with reference to the position of the marker portion 1301. In the above-described unit block 1300, the additional information may be partially extracted. In this case, data of the remaining portion where the additional information is not extracted may be complemented by data of another block to complete the data. That is, the additional information may be extracted by extracting data of the first portion in the first block and extracting data of the second portion other than the first portion in the second block different from the first block. In the example shown in FIG. 13, when the data is complete, a sequence of "0" and "1" for 800 bits is obtained. With respect to the data of the additional information as well, if, similar to the marker portion 1301, error detection data or error correction data is included, error detection or error correction is performed for the acquired data.

As described above, after the completion of the extraction of the additional information, processing of performing data analysis for the sequence extracted as the additional information, and converting the data into the format of the additional information at the time of embedding. For example, the additional information to be embedded is regarded as text document data, and is converted, in advance, into a numerical value by the character code "Shift JIS".

In a single-byte code (one-byte character) of the Shift JIS, conversion corresponding to a numerical value and a character can be performed in the combination of upper 4 bits and lower 4 bits. For example, if the upper 4 bits are "0100" and the lower 4 bits are "0001", "A" is determined as a character string. It is thus possible to perform conversion into a corresponding character by performing conversion processing for the extracted sequence based on a conversion map held or prepared in advance.

The sequence extracted as the additional information is temporarily held in the RAM 104, and it is possible to relatively easily implement the conversion processing with reference to the "Shift JIS" conversion map held in advance in the secondary storage device 105 (see FIG. 1).

As an example, if the sequence of the additional information extracted by an additional information extraction portion 1702 is "0110100001100101011011000110110001101111", it is converted, as follows, in accordance with the conversion map according to this example.

A character "h" is obtained from the upper 4 bits "0110" and the lower 4 bits "1000".

A character "e" is obtained from the upper 4 bits "0110" and the lower 4 bits "0101".

A character "l" is obtained from the upper 4 bits "0110" and the lower 4 bits "1100".

The character "l" is obtained from the upper 4 bits "0110" and the lower 4 bits "1100".

A character "o" is obtained from the upper 4 bits "0110" and the lower 4 bits are "1111", Therefore, a character string of "hello" is obtained. The extracted character string is displayed on the display 106 by the display processing module 401 (see FIG. 4). If the extracted character string is a URL, a network can be connected and a screen of the URL destination can be displayed on the display 106 using a predetermined browser. If the URL is a moving image site, a moving image may be reproduced by the display 106 and a loudspeaker (not shown).

With the above processing, the pattern having predetermined periodicity (or a frequency corresponding to it) is superimposed on the target image, thereby embedding the additional information in the image. Then, the spatial frequency characteristics are calculated by analyzing the plurality of small areas 1701 in the captured image obtained by capturing the printed product 1601. From the spatial frequency characteristic for each small area 1701, the embedded signal strength and the embedding position of the additional information in the captured image is specified or estimated. Based on the specified or estimated embedding position or embedded signal strength, the position of the marker detection area 1605 in the captured image is decided, and marker detection is executed in the decided marker detection area 1605. Then, by setting the detected marker position as a reference, it is possible to acquire the additional information in the captured image. This can specify a specific degree of signal strength with which digital watermark information is embedded at a specific position in the captured image. Based on this, it is possible to perform control to acquire the additional information. Therefore, according to this embodiment, it is possible to relatively easily acquire various forms of digital watermark information, and the present invention can be advantageous for diverse methods of reading a digital watermark.

Second Embodiment

The above-described first embodiment has exemplified the form of acquiring the embedded additional information while changing the position of the marker detection area 1605. In the second embodiment, a predetermined notification may be made by a display 106 to a user who operates an image processing apparatus (portable terminal) 100.

Figure 21A:
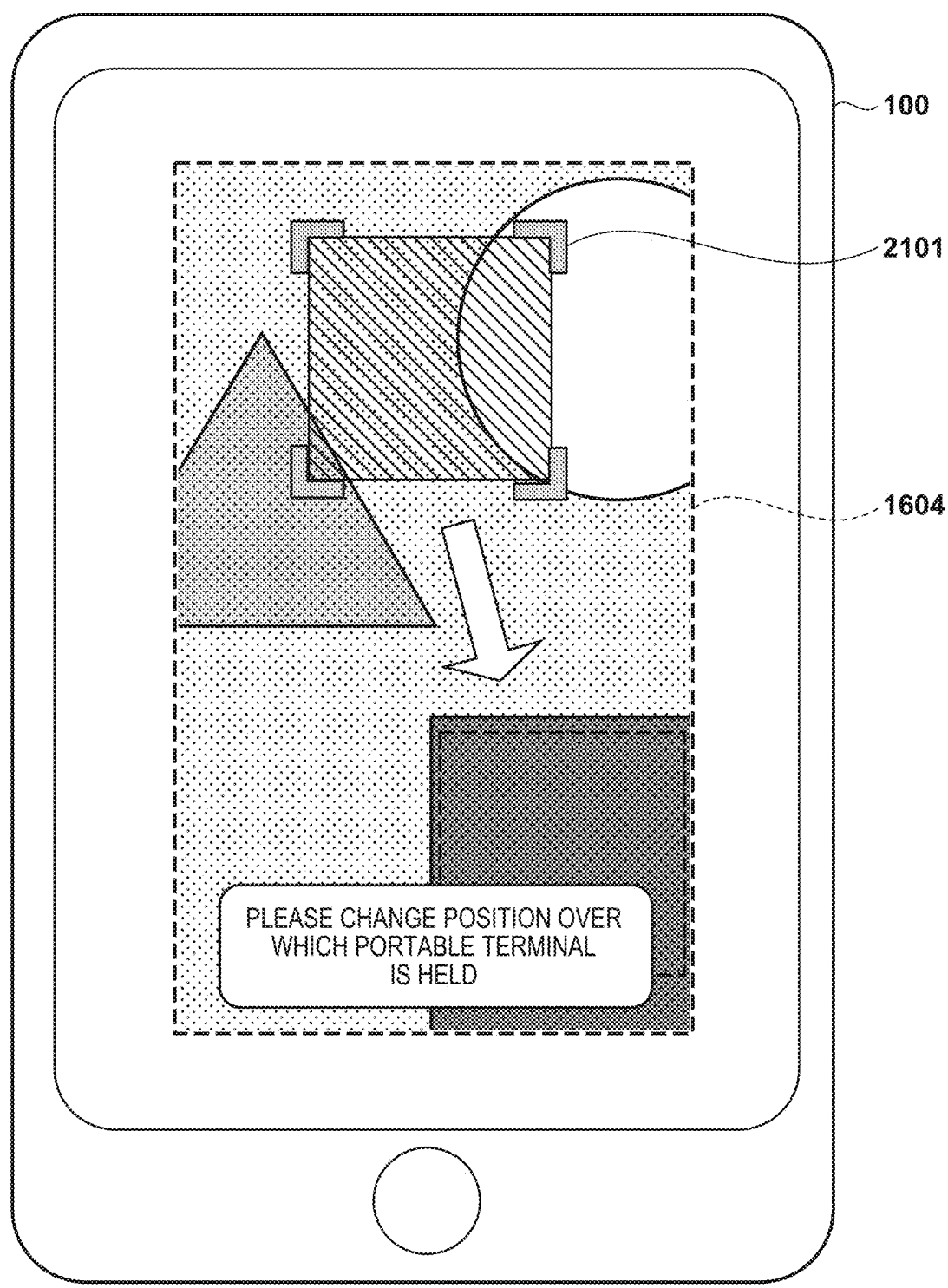
FIG. 21A is a view showing an example of a notification by a display.

FIG. 21A shows, as an example of the notification, a form of performing display to prompt the user to move the portable terminal 100. In this example, the current marker detection area 1605 is displayed as a guide 2101, and a position where additional information is more easily read is visually displayed.

In addition, a notification is more preferably made by characters of "please change the position over which the portable terminal is held". Upon receiving the notification, the user changes the position of the portable terminal 100 with respect to a printed product 1601 to make it possible to read the additional information at a position in the printed product 1601 where an embedded signal strength is high, thereby appropriately implementing the reading operation.

Note that in a region close to the edge portion of the captured image, it may generally be difficult to adjust the focal length at the time of image capturing. Furthermore, if image capturing is performed using a light source which can typically he provided in the portable terminal 100, the light amount of the light source may be insufficient. That is, even if the embedded signal strength is the same, it may be difficult to appropriately read the additional information in the above-described cases. Therefore, if a small area 1701 where the embedded signal strength is high exists outside a marker detection area 1605, image capturing is performed in the marker detection area 1701 where the additional information is easily read, thereby performing the reading operation with the improved embedded signal strength.

Figure 21B:
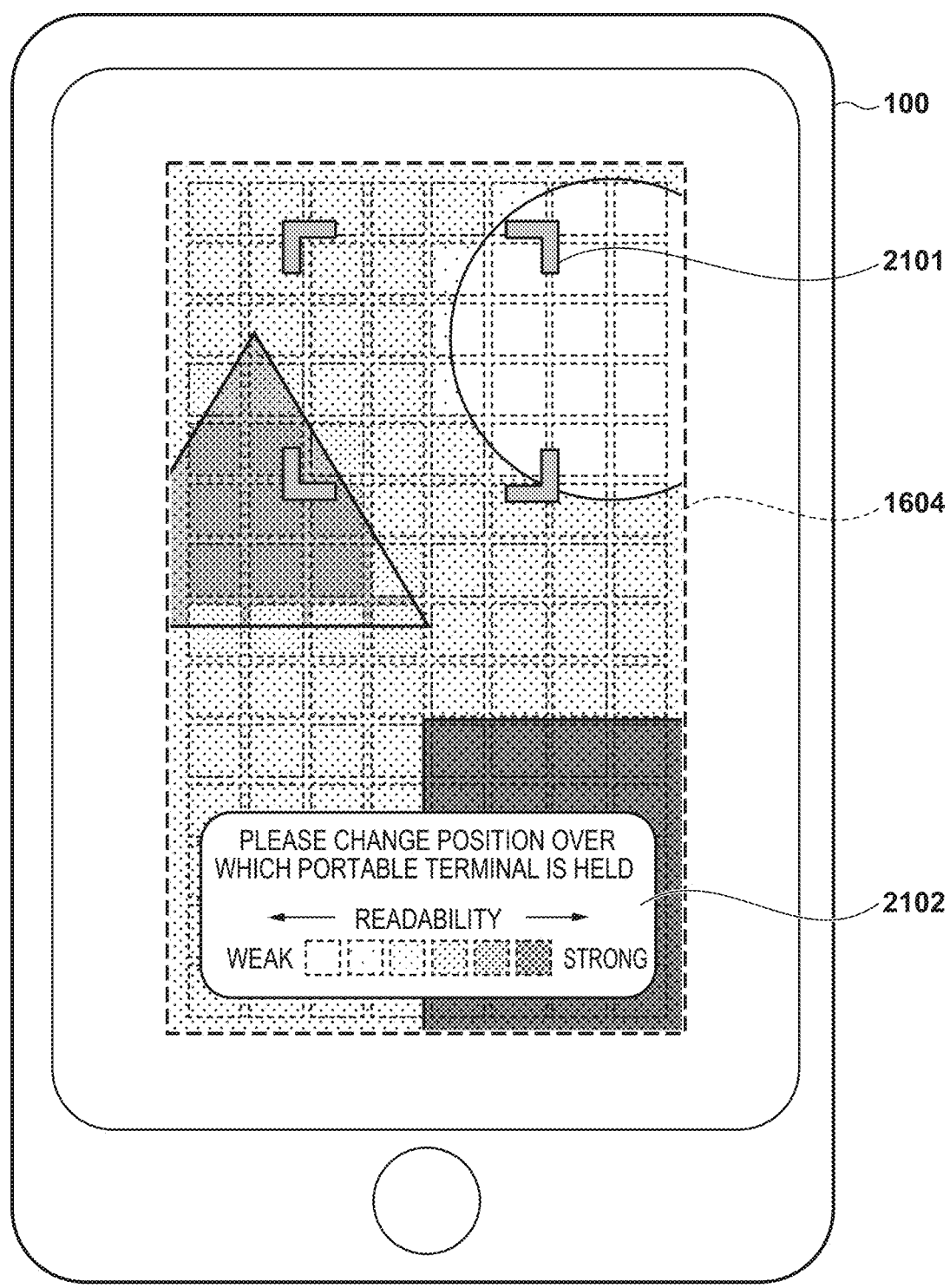
FIG. 21B is a view showing an example of a notification by the display.

FIG. 21B shows, as an example of the form of visually making a notification to the user, a form of superimposing and displaying the feature amount (see FIG. 17B) of each small area 1701 on the captured image. At this time, a notification 2102 is visually made so that the user can grasp the ease of reading of the additional information.

Furthermore, the embedded signal strength of each small area 1701 included in the marker detection area 1605 may be visually displayed. For example, the color of the frame of the guide 2101 or the color of each small area 1701 may be changed in accordance with the embedded signal strength.

According to this embodiment, in addition to the effects described in the first embodiment, it is possible to more appropriately implement reading of the additional information using the portable terminal 100, and thus this embodiment can be advantageous in improving the usability of the portable terminal 100.

Third Embodiment

The above-described first embodiment assumes that the spatial frequency information obtained by frequency analysis is calculated as the image characteristics of the plurality of small areas 1701, and the embedded signal strength and the embedding position of the addition information are specified or estimated using the image characteristics. However, this may be implemented by another form. For example, color information in a captured image may be used.

Figure 22:
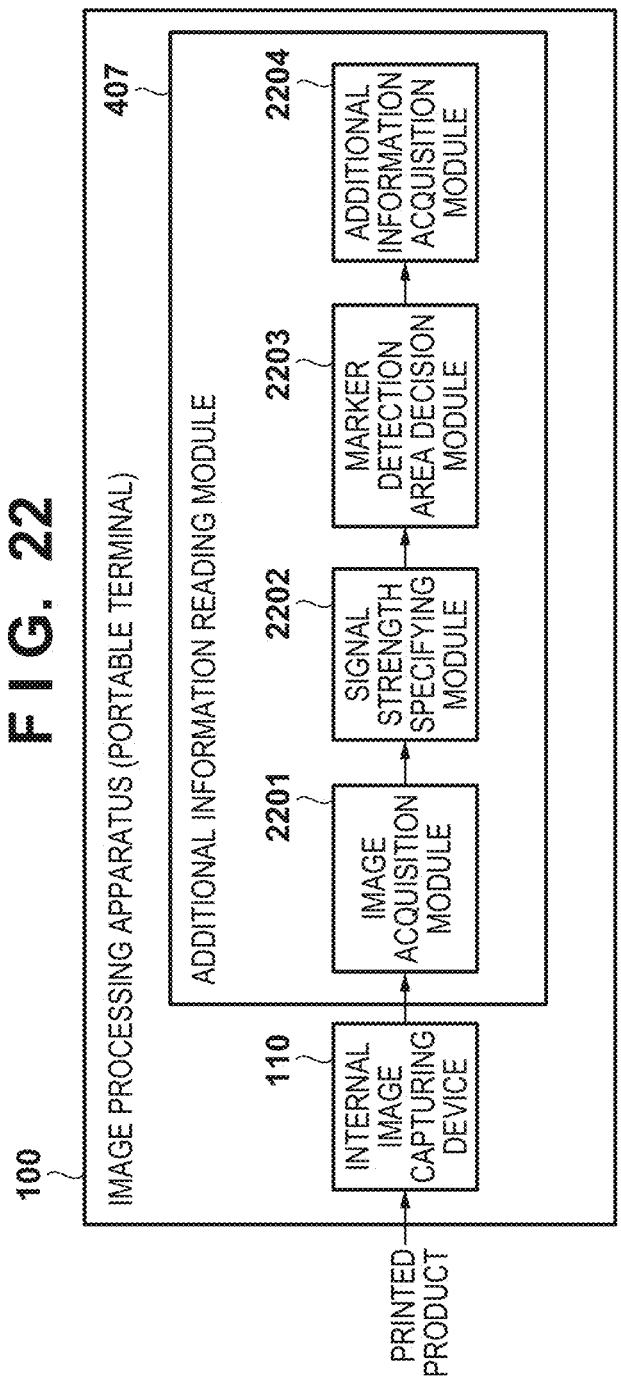
FIG. 22 is a block diagram including an additional information reading module.

FIG. 22 is a block diagram showing another example of the arrangement of an image processing apparatus 100 for performing additional information reading processing according to the third embodiment. An additional information reading module 407 included in an application 400 of the image processing apparatus 100 includes an image acquisition module 2201, a signal strength specifying module 2202, a marker detection area decision module 2203, and an additional information acquisition module 2204.

Similar to the image acquisition module 1501 of the first embodiment, the image acquisition module 2201 controls driving of an internal image capturing device 110, and captures a printed product 1601 embedded with additional information, thereby acquiring image data. The image data obtained by the image capturing operation is sent to the signal strength specifying module 2202.

Based on color information (RGB values) of the image data, the signal strength specifying module 2202 specifies or estimates the embedded signal strength and the embedding position of the additional information. More specifically, a reference table in which the embedded signal strength can be referred to in correspondence with the RGB values is held in advance in the application 400 of the image processing apparatus 100, and conversion into the embedded signal strength is performed with reference to the reference table for each pixel of the image data. This conversion processing may be performed for the pixel value of each pixel of the image data, or for a representative value of the RGB values calculated for each of a plurality of small areas 1701 defined as in the first embodiment. Examples of the representative value are the average value, mode, and median of the RGB values of the small area 1701.

Note that similar to the signal strength specifying module 1503, the signal strength specifying module 2202 may be referred to as the signal strength estimation module 2202 or may simply be referred to as the specifying module or the estimation module.

FIG. 23 shows an embedded signal strength conversion table 2301 as an example of the above-described reference table. Although details will be described later, the table 2301 is a 3D lookup table (3D-LUT) in which the embedded signal strength is associated with a combination of the RGB values of the color in which the additional information is to be embedded. Each of the R value, G value, and B value takes one of 0, 32, 64, 96, 128, 160, 192, 224, and 255, and the table 2301 shows 729 data (=9×9×9).

The table 2301 is obtained by measuring, in advance, for each color, the embedded signal strength for the RGB values. For example, additional information of a marker portion 1301 and a data portion 1302 exemplified in FIG. 13 is embedded in a patch image of (R, G, B)=(128, 128, 128) having a size of 240 px×240 px, and the image is printed by a printer 112. The patch image is captured to measure the embedded signal strength by the same procedure as in the above-described first embodiment. This measurement processing can sequentially be performed for 729 colors, thereby creating the lookup table 2301. Note that when capturing the patch image, image capturing conditions (for example, the distance from the printed product 1601 and illumination) are preferably fixed.

The embedded signal strength for arbitrary RGB values is obtained from the RGB values by, for example, tetrahedral interpolation of the 3D-LUT As another example of the interpolation method, cubic interpolation or triangular prism interpolation as a known linear interpolation method may be used.

Processing after the marker detection area decision module 2203 is the same as in the first embodiment and a description thereof will he omitted.

Note that this embodiment has exemplified the form of using the RGB values as the input values of the conversion table 2301. However, another color space may be used. For example, CIE-XYZ, YCbCr (YUV), or CIE-tab may be used.

Furthermore, the RGB values when embedding the additional information are normally processed as values in the sRGB color space. However, if the RGB values of a captured image obtained from an internal image capturing device 110 are RGB values unique to a device for which no color management is performed, the RGB values are different from the RGB values in the sRGB color space. In this case, a 3D-LUT for device RGB-sRGB conversion may be held in advance in the application 400 so as to correct the difference. In this case, a device type is selected on the application UI when reading the additional information, and color conversion is performed with reference to the 3D-LUT corresponding to the device type, thereby making it possible to specify or estimate the embedded signal strength corresponding to the device type.

Furthermore, if the embedded signal strength changes depending on the sheet type of the printed product 1601, a 3D-LUT for each sheet may be held in advance in the application 400. In this case, the sheet type of the printed product 1601 is selected on the application UI when reading the additional information, and conversion is performed with reference to the 3D-LUT corresponding to the sheet type, thereby making it possible to specify or estimate the embedded signal strength corresponding to the sheet type.

According to this embodiment, it is possible to specify or estimate the embedded signal strength and the embedding position of additional information in a captured image of the printed product 1601 embedded with the additional information based on color information in the captured image. Therefore, according to this embodiment as well, it is possible to obtain the effects described. in the first embodiment.

Other Embodiments

Each of the above-described embodiments has exemplified the form of repeatedly embedding the same additional information in each unit block 1300 of the entire print image. The present invention, however, is not limited to this. For example, in each unit block 1300, a different piece of information may be embedded. Alternatively, the unit blocks 1300 may he classified into a plurality of groups, the first additional information may he embedded in each block of the first group, and the second additional information different from the first additional information may be embedded in each block of the second group different from the first group. Note that the first group and the second group may he concentratedly arranged in a predetermined region in the print image, or dispersedly arranged. The number of groups may be three or more.

Each of the above-described embodiments has exemplified the form in which a region embedded with additional information is a block of a predetermined size. The present invention, however, is not limited to this. For example, the block need not have a rectangular shape and may have another arbitrary shape.

The additional information may be variable-length information, and information indicating the size of the additional information (a range within which the additional information is embedded) may be embedded in a predetermined location (for example, the first portion) of the data portion 1302 of the unit block 1300. For example, in the case of 800 bits, first some bits (for example, 80 bits) may indicate the range within which the additional information is embedded in the unit block 1300.

If there are a plurality of methods of embedding the additional information, a plurality of rules corresponding to these methods are predefined in the application 400, and information for identifying and selecting the corresponding rule may be embedded in, for example, the first header portion of the additional information. In this case, the additional information is extracted based on the identified rule, Furthermore, each of the above-described embodiments has exemplified the form in which the image processing apparatus 100 and the printer 112 are connected by the network, and the print data generated by the image processing apparatus 100 is printed by the printer 112. The present invention, however, is not limited to this. For example, the printer 112 may include the application 400, and the printer 112 may output the printed product 1601 embedded with the additional information based on the print data generated by itself. That is, some of the functions of the application 400 described in the embodiments may be provided in the printer 112.

<<Program>>

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

<<Others>>

In the above description, the printer 112 using the inkjet printing method has been described as an example. However, the printing method is not limited to this. Furthermore, the printer 112 may be a single function printer having only a printing function or may be a multi-function printer having a plurality of functions such as a printing function, a FAX function, and a scanner function. In addition, the printer 112 may be a manufacturing apparatus configured to manufacture, fir example, a color filter, an electronic device, an optical device, a microstructure, or the like using a predetermined printing method.

Furthermore, "print" in this specification should be interpreted in a broader sense. Hence, the mode of "print" is irrespective of whether or not the target to be formed on a print medium is significant information such as a character or graphic pattern, and is also irrespective of whether the target is manifested in a way that can be perceived visually by humans.

"Print medium" should also he interpreted in a broader sense, like "print". Hence, the concept of "print medium"

can include not only paper used in general but also any materials capable of receiving ink, including fabrics, plastic films, metals, glass, ceramics, resins, wood, and leathers.

Ink should also be interpreted in a broader sense, like "print". Hence, the concept of "ink" can include not only a liquid that is applied to a print medium to form an image, a design, a pattern, or the like but also an incidental liquid that can be provided to process a print medium or process ink (for example, coagulate or insolubilize color materials in ink applied to a print medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-091804, filed on May 31, 2021, which is hereby incorporated by reference herein in its entirety.

What is claimed is:

1. A digital watermark analysis apparatus comprising:
   an image capturing unit configured to capture a printed product in which additional information is embedded by superimposing, a pattern having a predetermined period or frequency on an image, and acquire a thus obtained image as a captured image;
   a calculation unit configured to calculate a spatial frequency characteristic of each small area by analyzing a plurality of small areas in the captured image;
   a specifying unit configured to specify an embedded signal strength and an embedding position of the additional information in the captured image based on the spatial frequency characteristic;
   a decision unit configured to decide, based on the embedding position information and the embedded signal strength information, a position, in the captured image, of a marker detection area for detecting a marker as a reference position for acquiring the additional information; and
   an acquisition unit configured to detect a marker in the marker detection area and acquire the additional information in the captured image with reference to a position of the detected marker.

2. The apparatus according to claim 1, wherein the decision unit decides the position of the marker detection area so that an average value of embedded signal strengths of the small areas included in the marker detection area is largest.

3. The apparatus according to claim 1, wherein the decision unit displays a guide corresponding to the embedding position and the embedded signal strength on a screen of a display unit.

4. The apparatus according to claim 3, wherein the decision unit displays the guide so that an average value of embedded signal strengths of the small areas included in the guide is largest.

5. A digital watermark analysis method comprising:
   capturing a printed product in which additional information is embedded by superimposing a pattern having a predetermined period or frequency on an image, and acquiring a thus obtained image as a captured image;
   calculating a spatial frequency characteristic of each small area by analyzing a plurality of small areas in the captured image;
   specifying an embedded signal strength and an embedding position of the additional information in the captured image based on the spatial frequency characteristic;
   deciding, based on the embedding position information and the embedded signal strength information, a position, in the captured image, of a marker detection area for detecting a marker as a reference position for acquiring the additional information; and
   detecting a marker in the marker detection area and acquiring the additional information in the captured image with reference to a position of the detected marker.

6. The method according to claim 5, wherein in the deciding, the position of the marker detection area is decided so that an average value of embedded signal strengths of the small areas included in the marker detection area is largest.

7. The method according to claim 5, wherein in the deciding, a guide corresponding to the embedding position and the embedded signal strength is displayed on a screen of a display unit.

8. The method according to claim 7, wherein in the deciding, the guide is displayed so that an average value of embedded signal strengths of the small areas included in the guide is largest.

9. A digital watermark analysis method comprising:
   capturing a printed product in which additional information is embedded by superimposing a pattern having a predetermined period or frequency on an image, and acquiring a thus obtained image as a captured image;
   specifying an embedded signal strength and an embedding position of the additional information based on color information of each pixel in the captured image and information representing the relationship between a digital watermark signal strength and the color information held in advance;
   deciding, based on the embedding position information and the embedded signal strength information, a position, in the captured image, of a marker detection area for detecting a marker as a reference position for acquiring the additional information; and
   detecting a marker in the marker detection area and acquiring the additional information in the captured image with reference to a position of the detected marker.

10. The method according to claim 9, wherein in the deciding, the position of the marker detection area is decided so that an average value of embedded signal strengths of the small areas included in the marker detection area is largest.

11. The method according to claim 9, wherein in the deciding, a guide corresponding to the embedding position and the embedded signal strength is displayed on a screen of a display unit.

12. The method according to claim 11, wherein in the deciding, the guide is displayed so that an average value of embedded signal strengths of the small areas included in the guide is largest.

* * * * *